US006735773B1

(12) United States Patent
Trinh et al.

(10) Patent No.: US 6,735,773 B1
(45) Date of Patent: May 11, 2004

(54) METHOD AND APPARATUS FOR ISSUING COMMANDS TO A NETWORK PROCESSOR CONFIGURED TO PROVIDE A PLURALITY OF APIS

(75) Inventors: Man Dieu Trinh, San Jose, CA (US); Chi-Hua Chang, Milpitas, CA (US); Srinivas Dabir, Saratoga, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/344,640

(22) Filed: Jun. 25, 1999

Related U.S. Application Data

(63) Continuation-in-part of application No. 09/271,061, filed on Mar. 16, 1999.
(60) Provisional application No. 60/090,939, filed on Jun. 27, 1998.

(51) Int. Cl.[7] .............................................. G06F 15/16
(52) U.S. Cl. ........................................ 719/328; 709/229
(58) Field of Search ................................ 709/223, 229, 709/328; 719/328

(56) References Cited

U.S. PATENT DOCUMENTS

| | | | |
|---|---|---|---|
| 4,024,507 A | 5/1977 | Berkling et al. |
| 4,586,134 A | 4/1986 | Norstedt |
| 4,700,294 A | 10/1987 | Haynes |
| 5,218,687 A | 6/1993 | Ducousso et al. |
| 5,287,537 A | 2/1994 | Newmark et al. |
| 5,295,135 A | 3/1994 | Kammerl |
| 5,379,297 A | 1/1995 | Glover et al. |
| 5,394,402 A | 2/1995 | Ross |
| 5,414,707 A | 5/1995 | Johnston et al. |
| 5,481,536 A | 1/1996 | Reisch et al. |
| 5,515,370 A | 5/1996 | Rau |
| 5,517,488 A | 5/1996 | Miyazaki et al. |

(List continued on next page.)

OTHER PUBLICATIONS

"LAN Emulation Over ATM Version 2—LUNI Specification", The ATM Forum Technical Committee; AF–LANE–0084.00; Jul. 1997; 153 pages.

Passmore et al., "The Virtual LAN Technology Report", Decisys, Inc., 1996, pp. 1–20.

"ATM Internetworking", White Paper, May 1995; pp. 1,25–49.

Ghani et al., "Hierarchical Scheduling for Integrated ABR/VBR Services in ATM Networks", Globecom 97, IEEE Global Telecommunications Conference; pp. 779–784.

Lin, Dong; Constant–Time Dynamic ATM Bandwidth Scheduling for Guaranteed and Best Effort Services With Overbooking: IEEE INFOCOM '97; pp. 398–405.

Chiussi et al., "Virtual Queuing Techniques for ABR Service: Improving ABR/VBR Interaction", IEEE Infocom '97; pp. 406–418.

Benmohamed et al., "A Control–Theoretic ABR Explicit Rate Algorithm for ATM Switches with PER–VC Queuing", IEEE Infocom '98; pp. 183–191.

*Primary Examiner*—Krisna Lim
(74) *Attorney, Agent, or Firm*—Blakely, Sokoloff, Taylor & Zafman LLP

(57) ABSTRACT

The present invention provides techniques for controlling the functionality of a network processor and for facilitating integration of the network processor with a host system. Application programming interfaces (APIs) are provided which can be invoked by the host system for performing device level functions on the network processor. The APIs are provided by a device control module which may execute either on the host system or on the network processor. A host application may invoke an API and the function corresponding to the invoked API is performed by the network processor. Responses or results from the function execution may then be forwarded by the network processor to the host application.

31 Claims, 6 Drawing Sheets

U.S. PATENT DOCUMENTS

| | | |
|---|---|---|
| 5,535,201 A | 7/1996 | Zheng |
| 5,539,729 A | 7/1996 | Bodnar |
| 5,555,256 A | 9/1996 | Calamvokis |
| 5,555,265 A | 9/1996 | Kakuma et al. |
| 5,564,051 A | 10/1996 | Halliwell et al. |
| 5,574,875 A | 11/1996 | Stansfield et al. |
| 5,590,128 A | 12/1996 | Maloney et al. |
| 5,619,650 A | 4/1997 | Bach et al. |
| 5,638,371 A | 6/1997 | Raychaudhuri et al. |
| 5,640,399 A | 6/1997 | Rostoker et al. |
| 5,652,872 A | 7/1997 | Richter et al. |
| 5,659,794 A | 8/1997 | Caldarale et al. |
| 5,664,116 A | 9/1997 | Gaytan et al. |
| 5,684,797 A | 11/1997 | Aznar et al. |
| 5,684,954 A | 11/1997 | Kaiserswerth et al. |
| 5,696,930 A | 12/1997 | Garetz et al. |
| 5,701,300 A | 12/1997 | Jeon et al. |
| 5,726,985 A | 3/1998 | Daniel et al. |
| 5,740,171 A | 4/1998 | Mazzola et al. |
| 5,742,772 A | 4/1998 | Sreenan |
| 5,745,477 A | 4/1998 | Zheng et al. |
| 5,745,790 A | 4/1998 | Oskouy |
| 5,748,630 A | 5/1998 | Bergantino et al. |
| 5,751,709 A | 5/1998 | Rathnavelu |
| 5,751,951 A | 5/1998 | Osborne et al. |
| 5,751,955 A | 5/1998 | Sonnier et al. |
| 5,754,530 A | 5/1998 | Awdeh et al. |
| 5,764,895 A | 6/1998 | Chung |
| 5,771,231 A | 6/1998 | Watanabe |
| 5,796,715 A | 8/1998 | Patterson et al. |
| 5,796,978 A | 8/1998 | Yoshioka et al. |
| 5,805,805 A | 9/1998 | Civanlar et al. |
| 5,812,550 A | 9/1998 | Sohn et al. |
| 5,825,765 A | 10/1998 | Menzilcioglu et al. |
| 5,835,928 A | 11/1998 | Auslander et al. |
| 5,841,772 A | 11/1998 | Daniel et al. |
| 5,848,068 A | 12/1998 | Daniel et al. |
| 5,857,075 A | 1/1999 | Chung |
| 5,867,712 A | 2/1999 | Shaw et al. |
| 5,870,561 A | 2/1999 | Jarvis et al. |
| 5,875,173 A | 2/1999 | Ohgane et al. |
| 5,878,232 A | 3/1999 | Marimuthu |
| 5,892,828 A * | 4/1999 | Perlman ..................... 713/183 |
| 5,905,874 A | 5/1999 | Johnson |
| 5,909,441 A | 6/1999 | Alexander, Jr. et al. |
| 5,910,955 A | 6/1999 | Nishimura et al. |
| 5,912,892 A | 6/1999 | Barnhart et al. |
| 5,926,636 A * | 7/1999 | Lam et al. ................... 709/313 |
| 5,935,249 A | 8/1999 | Stern et al. |
| 5,943,693 A | 8/1999 | Barth |
| 5,956,336 A | 9/1999 | Loschke et al. |
| 5,974,457 A | 10/1999 | Waclawsky et al. |
| 5,974,462 A | 10/1999 | Aman et al. |
| 5,978,951 A | 11/1999 | Lawler et al. |
| 5,983,332 A | 11/1999 | Watkins |
| 5,991,854 A | 11/1999 | Watkins |
| 6,003,027 A | 12/1999 | Prager |
| 6,005,943 A | 12/1999 | Cohen et al. |
| 6,021,263 A | 2/2000 | Kujoory et al. |
| 6,041,059 A | 3/2000 | Joffe et al. |
| 6,052,383 A | 4/2000 | Stoner et al. |
| 6,058,434 A | 5/2000 | Wilt et al. |
| 6,073,175 A | 6/2000 | Tavs et al. |
| 6,085,252 A | 7/2000 | Zhu et al. |
| 6,104,700 A | 8/2000 | Haddock et al. |
| 6,119,170 A | 9/2000 | Schoffelman et al. |
| 6,128,713 A * | 10/2000 | Eisler et al. ................. 711/159 |
| 6,144,996 A | 11/2000 | Starnes et al. |
| 6,147,975 A | 11/2000 | Bowman-Amuah |
| 6,154,776 A | 11/2000 | Martin |
| 6,163,541 A | 12/2000 | Casey et al. |
| 6,167,049 A | 12/2000 | Pei et al. |
| 6,172,991 B1 | 1/2001 | Mori |
| 6,195,697 B1 | 2/2001 | Bowman-Amuah |
| 6,198,751 B1 | 3/2001 | Dorsey et al. |
| 6,201,971 B1 | 3/2001 | Purnadi et al. |
| 6,223,292 B1 | 4/2001 | Dean et al. |
| 6,269,396 B1 | 7/2001 | Shah et al. |
| 6,272,544 B1 | 8/2001 | Mullen |
| 6,285,674 B1 | 9/2001 | Soni et al. |
| 6,285,684 B1 | 9/2001 | Suzuki et al. |
| 6,311,212 B1 | 10/2001 | Chong et al. |
| 6,311,238 B1 | 10/2001 | Hebert |
| 6,337,863 B1 | 1/2002 | Nair et al. |
| 6,343,078 B1 | 1/2002 | Bronstein et al. |
| 6,411,625 B1 | 6/2002 | Furuhashi et al. |
| 6,425,067 B1 | 7/2002 | Chong et al. |
| 6,452,923 B1 | 9/2002 | Gerszberg et al. |
| 6,604,136 B1 * | 8/2003 | Chang et al. ................ 709/223 |
| 6,631,435 B1 * | 10/2003 | Lym et al. ................... 710/305 |

* cited by examiner

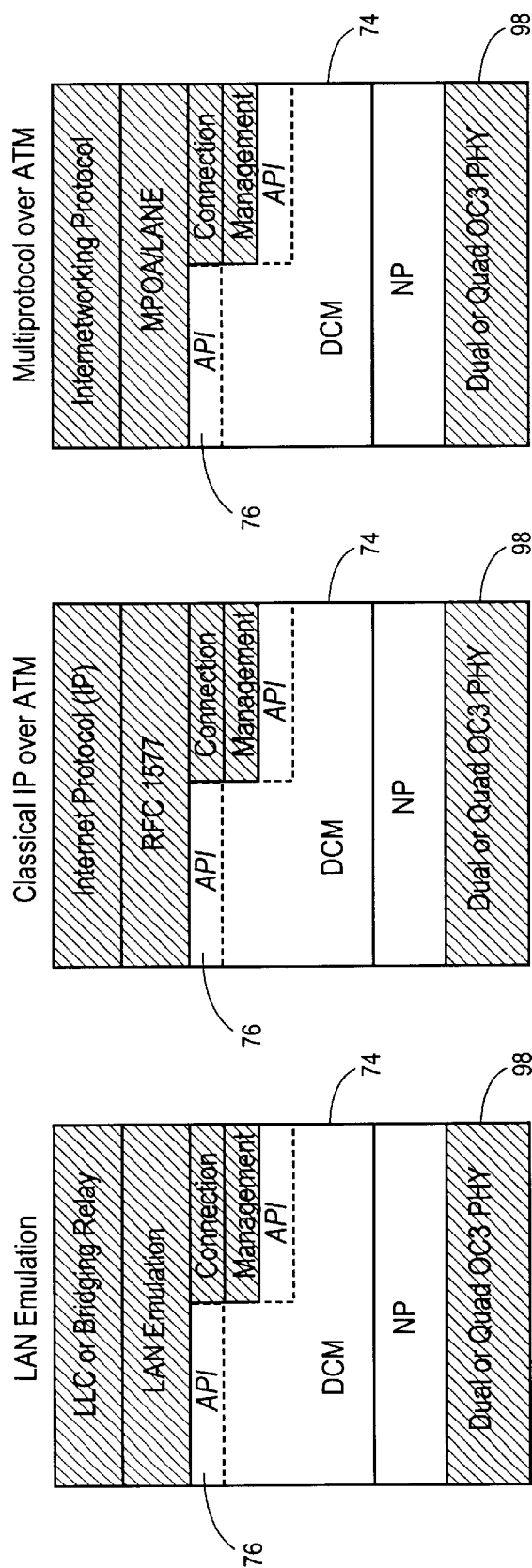

METHOD AND APPARATUS FOR ISSUING COMMANDS TO A NETWORK PROCESSOR CONFIGURED TO PROVIDE A PLURALITY OF APIS

CROSS-REFERENCES TO RELATED APPLICATIONS

This application claims priority from U.S. Provisional Patent Application No. 60/090,939, entitled "NETWORK ACCELERATOR SUBSYSTEM BASED ON SINGLE-CHIP NETWORK PROCESSOR AND INTERFACE PROTOCOL," filed Jun. 27, 1998, the entire disclosure of which is herein incorporated by reference for all purposes. This application also claims cip from U.S. patent application Ser. No. 09/271,061, entitled "TWO-DIMENSIONAL QUEUING/DE-QUEUING METHODS AND SYSTEMS FOR IMPLEMENTING THE SAME," filed Mar. 16, 1999, the entire disclosure of which is herein incorporated by reference for all purposes.

The following patent applications, including this one, are filed concurrently, and the disclosure of each other application is hereby incorporated by reference in its entirety into this application for all purposes:

U.S. patent application Ser. No. 09/344,640, entitled "METHOD AND APPARATUS FOR CONTROLLING A NETWORK PROCESSOR", filed on Jun. 25, 1999.

U.S. patent application Ser. No. 09/344,608, entitled "SYSTEM AND METHOD FOR PERFORMING CUT-THROUGH FORWARDING IN AN ATM NETWORK SUPPORTING LAN EMULATION", filed on Jun. 25, 1999.

U.S. Pat. No. 6,604,136, entitled "SYSTEM AND METHOD FOR CONTROLLING A NETWORK PROCESSOR", filed on Jun. 25, 1999, and issued on Aug. 5, 2003.

U.S. Pat. No. 6,501,731, entitled "CBR/VBR TRAFFIC SCHEDULER", filed on Jun. 25, 1999, and issued on Dec. 31, 2002.

U.S. Pat. No. 6,603,768, entitled "MULTI-PROTOCOL CONVERSION ASSISTANCE METHOD AND SYSTEM FOR A NETWORK ACCELERATOR", filed on Jun. 25, 1999, and issued on Aug. 5, 2003.

U.S. Pat. No. 6,425,067, entitled "SYSTEMS AND METHODS FOR IMPLEMENTING POINTER MANAGEMENT", filed on Jun. 25, 1999, and issued on Jul. 23, 2002.

U.S. Pat. No. 6,625,650, entitled "SYSTEM FOR MULTI-LAYER BROADBAND PROVISIONING IN COMPUTER NETWORKS", filed on Jun. 25, 1999, and issued on Sep. 23, 2003.

U.S. patent application Ser. No. 09/344,453, entitled "NETWORK ACCELERATOR SUBSYSTEM AND BASED ON SINGLE-CHIP NETWORK PROCESSOR AND INTERFACE PROTOCOL", filed on Jun. 25, 1999.

Additionally, the disclosure of each of the following pending patent applications is hereby incorporated by reference in its entirety into this application for all purposes:

U.S. Pat. No. 6,657,959, entitled "SYSTEMS AND METHODS FOR IMPLEMENTING ABR WITH GUARANTEED MCR", filed on Jun. 17,1999, and issued on Dec. 02, 2003.

U.S. Pat. No. 6,311,212, entitled "SYSTEMS AND METHODS FOR ON-CHIP STORAGE OF VIRTUAL CONNECTION DESCRIPTORS", filed on Mar. 16, 1999, and issued on Oct. 30, 2001.

COPYRIGHT NOTICE

A portion of the disclosure of this patent document contains material which is subject to copyright protection. The copyright owner has no objection to the xerographic reproduction by anyone of the patent document or the patent disclosure in exactly the form it appears in the U.S. Patent and Trademark Office patent file or records, but otherwise reserves all copyright rights whatsoever.

BACKGROUND OF THE INVENTION

The present invention is generally related to the networking field and more particularly to techniques for providing application user interfaces (APIs) for controlling the functionality of network processors.

The communication industry has experienced explosive growth stemming from increased demand for information and connectivity by both individual consumers and corporations. Due to the proliferation of the personal computer and the rise of communication networks, such as the Internet, there is an ever increasing need for faster communication between computers using efficient networks. In order to accommodate this explosive growth, carriers and backbone providers are rapidly introducing network infrastructures which offer exponentially more bandwidth and information carrying capacity than in the past.

In order to meet the growing demand for speed and bandwidth, network devices such as client computer systems, servers, hubs, routers, switches, network backbones, network processors, etc., are being forced to offer a wide range of services to meet consumer demands. These network processors have to be capable of supporting a plethora of emerging communication standards, transport protocols, and increased performance requirements. These network processors also have to perform a plurality of tasks such as performing translation between different network standards such as Ethernet and Asynchronous Transfer Mode (ATM), reformatting of data, traffic scheduling, routing of data cells, packets, messages, etc.

Although network processors now provide more services, the success or failure of these network processors depends largely on how easily they can be integrated with and controlled by a host device such as a computer. Due to the differing requirements of host applications, it is desired that the network processors provide facilities to perform control functions and network management functions both at a higher level of control and also at a more granular device level. Further, it is desired that the network processors provide facilities allowing host applications to make full use of the resources and services offered by the various existing and emerging networking standards.

SUMMARY OF THE INVENTION

According to the teachings of the present invention, techniques are provided for controlling the functionality of a network processor and for facilitating integration of the network processor with a host system or an application executing on the host system. The present invention provides application programming interfaces (APIs) which can be invoked by the host system or the host application for performing functions on the network processor. The APIs provided by the present invention allow a host to efficiently use resources and services offered by the network processor.

According to an aspect of the present invention, APIs are provided for controlling the network processor at a device level. These APIs offer fine-grained control of the network processor. In one embodiment, these APIs are provided by a device control module which may execute either on the host system or on the network processor. A host application may invoke an API and the function corresponding to the invoked API is performed by the network processor. Responses or results from the function execution may then be forwarded by the network processor to the host application.

According to another aspect of the present invention, APIs are provided for performing a plurality of device level functions. Examples of these functions include rest and initialization functions, configuration functions, diagnostic functions, buffer management functions, functions for handling virtual connections, functions for receiving and transmitting packets, dynamic memory access functions, and functions for controlling physical devices.

Other aspects and advantages of the invention will be better understood by reference to the following detailed description and the accompanying figures.

BRIEF DESCRIPTION OF THE DRAWINGS

FIGS. 4A, 4B and 4C depict the various upper layer software protocol stacks that may utilize the APIs provided by device control module (DCM) according to an embodiment of the present invention;

DESCRIPTION OF THE SPECIFIC EMBODIMENTS

According to the present invention, a network processor provides facilities allowing host applications to control the functioning of the network processor. The application programming interfaces (APIs) provided by the network processor allow a host application to control the functioning of the network processor at both a high level and also at a lower device level. The host application is accordingly offered the desired level of control. Further, APIs provided according to the present invention allow host applications to efficiently use resources and services offered by the various existing and emerging networking standards provided by the network processor.

Figure 1:
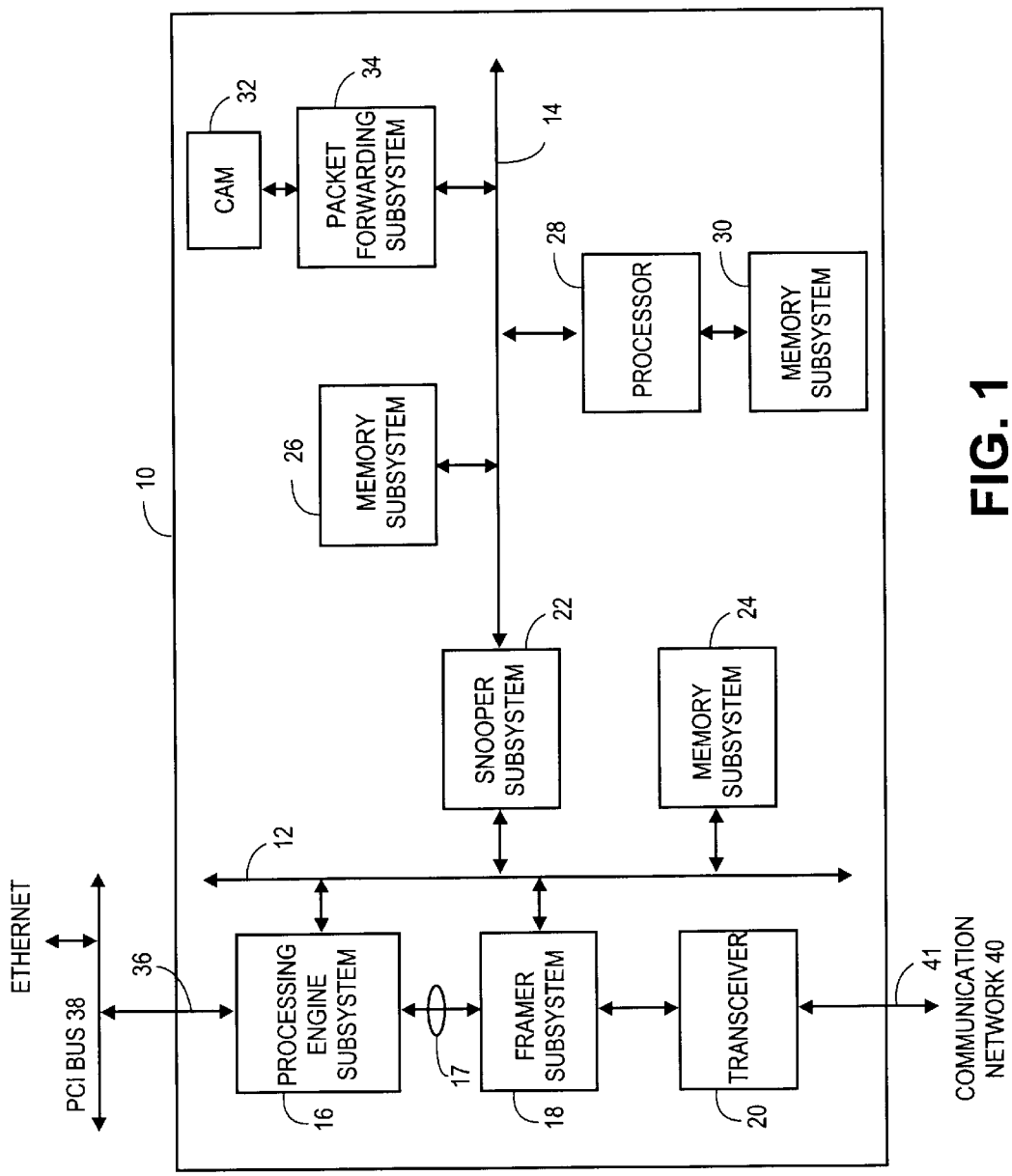
FIG. 1 depicts a simplified block diagram of a network processor according to an embodiment of the present invention.

FIG. 1 depicts a simplified block diagram of a network processor (NP) 10 according to an embodiment of the present invention. In the embodiment depicted in FIG. 1, network processor 10 is coupled with the Ethernet/Token Ring network via a PCI bus 38 and coupled with communication network 40 via communication link 41. In one embodiment network processor 10 includes a number of memories and subsystems coupled to a first internal bus 12 and a second internal bus 14. The subsystems coupled with first internal bus 12 may include a processing engine subsystem 16, a framer subsystem 18, a transceiver 20, a snooper subsystem 22, and memory subsystem 24. Subsystems coupled with second internal bus 14 may include a processor 28 along with its associated memory subsystem 30, a second memory subsystem 26, and a packet forwarding subsystem 34 coupled to a content addressable memory (CAM) 32. Internal buses 12 and 14 provide a mechanism allowing the various subsystems of network processor 10 to communicate with one another as intended.

Memory subsystems 24, 26, and 30 may include a number of memories including random access memories (RAMs) such as synchronous dynamic random access memory (SDRAM) and synchronous static random access memory (SSRAM). Memory subsystem 30 may also include flash memories for storing software images. Memory subsystems 24 and 26 provide storage facilities for software modules and other data constructs used by the present invention and those needed by network processor 10 to perform its functions. In one embodiment, memory subsystem 24 provides storage for data packets received by NP 10 from communication network 40 and from the Ethernet/Token Ring network.

Processing engine subsystem 16 provides processing services for a broad range of high speed network traffic types, including frames, cells, and packets at high data rates, for example, 622 Mbps full duplex. Processing engine subsystem 16 provides an industry standard PCI (e.g. 64 bit) and memory (e.g. 64-bit) interface. In one embodiment, processing engine subsystem 16 also provides an industry standard UTOPIA interface 17 for direct coupling with a broad range of Layer 1 physical interfaces. Processing engine subsystem 16 integrates Layer 2 functions and provides extensive hardware assist for processor 28 or packet forwarding subsystem 34 or Layer 3 functions for a variety of high speed network protocols.

Integrated functionality includes providing ATM interfaces for a packet switching core, providing packet interfaces for an ATM switching core, providing LEC functionality, providing multi-protocol over ATM client (MPC) functionality, memory management, system-level buffering, providing a flexible traffic scheduler, ATM Segmentation and Re-assembly (ATM SAR) functionality, Multi-Protocol Over ATM (MPOA) support, LANE support, tagging, multi-protocol label switch (MPLS) functionality, and raw packet format processing assist, hardware encapsulation and direct memory access (DMA) control. Processing engine subsystem 16 supports a broad range of applications executing on various access platforms, multi-protocol routers, internet protocol (IP), ATM and workgroup switches, and Gigabit Ethernet platforms. Processing engine subsystem 16 uses hardware-based state machines to obtain enhanced operation speed. There is no local processor within processing engine subsystem 16 in the path of any cell or packet transaction to slow down the operation of the system.

Figure 2:
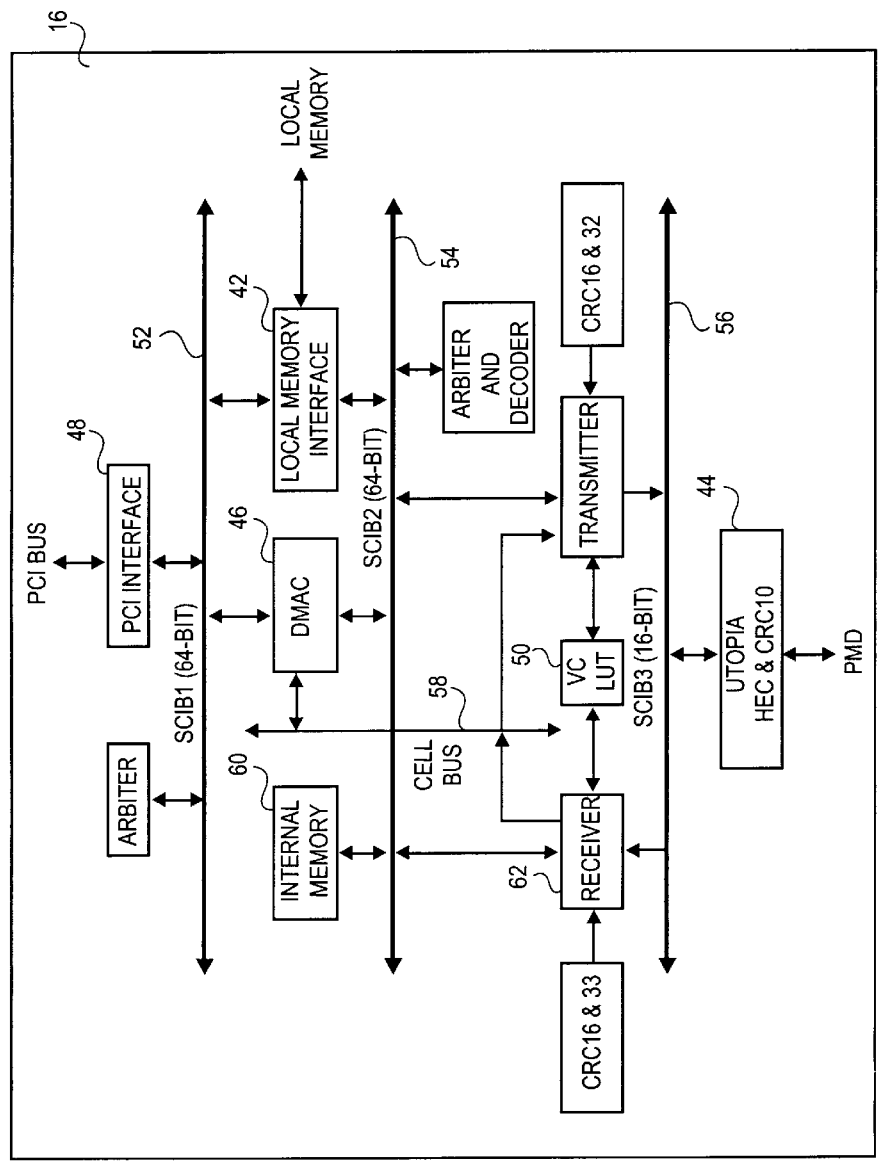
FIG. 2 depicts a simplified block diagram of the general architecture of a processing engine subsystem according to an embodiment of the present invention.

FIG. 2 depicts a simplified block diagram of the general architecture of processing engine subsystem 16 according to an embodiment of the present invention.

Processing engine 16 includes a local memory interface block 42, UTOPIA interface 44, Direct Memory Access Controller (DMAC) 46, PCI interface 48, VC caching and look-up table 50, first internal bus 52, second internal bus 54, third internal bus 56, and cell bus 58. Processing engine subsystem 16 also includes an internal memory 60 and a receiver module 62 and a transmitter module 64 for processing incoming and outgoing data transmissions, respectively, over a communications interface, such as UTOPIA interface 44. Local memory interface block 42 provides a connection to a local (off-chip) system memory, such as memory subsystem 24 which may include SDRAM, SSRAM or any combination thereof. DMAC 46 provides a high speed transfer mechanism for transferring data between external memories (PCI), internal memory 60 and the local memory. Internal memory 60 is used in one embodiment to store VC descriptors on-chip for fast access of VC descriptors. Additionally, in one embodiment, internal memory 60 stores allowed cell rate (ACR) and minimum cell rate (MCR) bitmaps to provide enhanced ABR traffic scheduling capabilities. Internal memory 60 may also have bitmaps to provide sophisticated receive buffer management.

PCI interface 48 provides a connection to external intelligence, such as a host computer system, and external packet memories. PCI interface 48 includes input and output buffers and performs write transactions in both directions. The inbound write may result when a memory external to NP 10 is read, while the outbound write may occur when NP 10 writes to external memory.

First and second internal buses 52 and 54 in one embodiment are non-multiplexed 32 bit address and 64 bit data buses. Depending on the desired line rate, PCI interface 48 may be configured to run at frequencies up to 33 MHz over a 32 bit PCI bus, or at frequencies up to 66 MHz over a 64 bit PCI bus. For example, to achieve a 622 Mbps line rate, a 64 bit interface is used with frequencies up to 66 MHz. UTOPIA interface 44 supports connections to a broad range of layer 1 physical interfaces, including, for example, OC-1, OC-3, OC-12, OC-48, OC-192 and DS-3 interfaces and the like. To support a 622 Mbps line rate, the UTOPIA data bus is 16 bits, whereas for a 155 Mbps line rate the UTOPIA bus is 8 bits. Third internal data bus 56 is an 8 or 16 bit UTOPIA compatible interface. Cell bus 58 is a 64 bit data path and is used to transfer cells or frames between internal cell/frame buffers of receiver block 62 and transmitter block 64 and the PCI memory space or local memory space through DMAC 46. Cell bus 58 allows several transactions to occur in parallel. For example, data payload transfers and descriptor data movement may occur simultaneously. Additionally, for a 622 Mbps line rate, cell bus 58 is capable of off-loading up to 160 MBps of bandwidth from local memory.

VC caching and look-up table 50 is used to translate the descriptor pointer address for a virtual channel (VC) that has been registered in processing engine subsystem's internal cache. In one embodiment, for each VC descriptor registered in the internal memory, there is an associated entry in VC LUT 50. The caching scheme significantly increases throughput and reduces the bandwidth needed in the local memory to fetch, update and process VC descriptors. In preferred embodiment, all components of processing engine subsystem 16 reside on a single chip (e.g., a single silicon chip), however in alternate embodiments, the components may be spread across many chips such that processing engine subsystem 16 is implemented using several chips.

The data processing capabilities of processing engine subsystem 16 can be generally classified into four areas: receive data (from the UTOPIA port), transmit data (to the UTOPIA port), DMA data transfer (between the PCI bus and the local bus), and UTOPIA loop back (from the UTOPIA port back to the UTOPIA port). Processing engine subsystem 16 transparently transfers packets from the PCI bus to the local bus and vice versa via direct memory access (DMA). Additionally, processing engine subsystem 16 transfers the received UTOPIA data back to the transmit UTOPIA port on a per VC basis.

Incoming data or data received from the UTOPIA port to either the local bus or the PCI bus is checked for the proper AAL or OAM protocol, and optionally policed for traffic shape conformance. For AAL5, the processing includes length and CRC-32 verification. For OAM cells, the CRC-10 is checked. Additionally, processing engine subsystem 16 has the ability to add, on a per VC basis a 4, 8, 12 or 16-byte tag to the front of each packet as will be discussed in more detail below.

Processing engine subsystem 16 performs three major operations on the outgoing data (from the PCI or the local bus to the UTOPIA port) according to a preferred embodiment of the present invention. First, engine 16 provides an offset which allows packet transmission to begin from any one of the first 63 bytes of the packet buffer on a per-packet basis. This offset option combined with a packet source's ability to place a packet anywhere within the first 63 bytes of the buffer implements a generic header capability. In preferred aspects, up to 63 bytes are added or removed from the front of the packet on a per-packet basis. Second, engine 16 optionally adds one of several predefined packet headers on a per-packet basis. Third, engine 16 adds the AAL and/or OAM overhead to the packet. According to one embodiment, engine 16 supports a wide range of packet encapsulations such as Raw ATM, AAL5 with LLC/SNAP, LANE (v1 and v2), MPOA, and MPOA without Tag.

Referring to the NP 10 architecture shown in FIG. 1, transceiver 20 receives and transmits traffic to communication network 40, such as an ATM network, via communication link 41. In one embodiment, transceiver 20 is a fiber-optic transceiver. In one embodiment, framer subsystem 18 creates cells from data stream received via ATM SONET via transceiver 20. Alternatively, framer subsystem 18 converts cells to data bit streams to be transported. Memory subsystem 24 provides memory resources for processing performed by processing engine subsystem 16. The ATM or Ethernet packets received by network processor 10 are usually written to memory subsystem 24.

Snooper subsystem 22 is coupled both to first internal bus 12 and second internal bus 14, and provides a bridge between the two internal buses. In one embodiment, snooper subsystem 22 "snoops" or extracts the headers of packets written to memory subsystem 24 and makes them accessible to packet forwarding subsystem 34 and processor 28 by writing them to memory subsystem 26. The snooped headers can then be accessed by processor 28 or by packet forwarding subsystem 34 for further processing.

Packet forwarding subsystem 34 provides the hardware assist for processing of data frames and packets in order to achieve broadband data path speed. In one embodiment, packet forwarding subsystem 34 is a re-programmable hardware device which may be configured to process Ethernet, voice, carrier access, LANE, or customer specific traffic types. According to an embodiment of the present invention, packet forwarding subsystem 34 also provides LAN emulation (LANE) and Layer 3 virtual LAN (VLAN) functionality.

CAM 32 facilitates processing performed by packet forwarding subsystem 34. In one embodiment CAM 32 stores LAN emulation client (LEC) up-link information which provides mapping of media access control (MAC) destination addresses to virtual channel connections (VCCs) and vice versa. The LEC up-link information is usually set up and maintained by processor 28. In one embodiment, CAM 32 is a hardware lookup table.

Processor 28 executes the system and application level functions/modules which provide the functionality of the present invention, including protocol stack assisted routing modules, for network processor 10. This includes applications for controlling the functionality of network processor 10. The software modules corresponding to the applications are generally stored in memory subsystem 30. In alternate embodiments, the software modules may be stored in any other memory accessible to processor 28 such as memory subsystem 26. Memory subsystem 26 provides memory resources for processing performed by processor 28 and packet forwarding subsystem 34. In one embodiment, memory subsystem 26 stores a LEC information table which is maintained and updated by processor 28 and is used by packet forwarding subsystem 34 and processor 28 for providing routing functionality. As new LECs are added or deleted from emulated LAN, processor 28 updates the LEC information table to reflect the current state of the emulated LAN.

FIGS. 3A through 3D depict examples of ways in which a host system may interface with network processor 10. In the embodiment depicted in FIG. 3A, network processor (NP) 10 is coupled with a host system 70 via a Peripheral Component Interconnect (PCI) bus 38 and also coupled with communication network 40. PCI bus 38 is merely an example of a mechanism by which NP 10 and host 70 communicate with each other. It should be apparent to one of ordinary skill in the art that other communication techniques may also be used and are within the scope of the present invention. NP 10 may be used for a variety of applications including implementation in multi-protocol network interface cards (NICs), server NICs, workgroup, IP and ATM switches, multi-protocol and IP routers ATM backbone switch applications, multiprotocol/ATM adapters and the like.

According to the present invention, device control module (DCM) 74 is responsible for controlling the functioning of NP 10. In one embodiment, DCM 74 provides a set of application programming interfaces (APIs) 76 which may be used by external application entities to issue commands to control the functionality of NP 10. APIs 76 allow applications such as host application 72 to issue commands to NP 10 and to receive messages/responses from NP 10. DCM 74 provides APIs for a plurality of functions performed by NP 10 and allows host application to exercise fine-grained device level control of NP 10. Examples of these functions include but are not limited to diagnostic functions, configuration functions, initialization functions, statistics gathering functions, interrupt handling, status and error monitoring functions, functions for managing physical layer hardware devices connected to NP 10 such as single OC12, dual OC3, or quad OC3 devices, and several other functions supported by NP 10. In the embodiment depicted in FIG. 3A, DCM 74 executes on host system 70. However, in alternate embodiments of the present invention, DCM 74 may execute on processor 28 of NP 10 or may execute on both host system 70 and NP 10.

As stated above, external applications such as host application 72 interface with NP 10 using APIs 76 provided by DCM 74. DCM 74 processes the commands issued by host application, and forwards them to subsystems and components of NP 10 for execution. DCM 74 may also receive responses to the commands which are then forwarded by DCM 74 to the external entities which issued the command. Responses may be provided in a synchronous or asynchronous manner. In alternate embodiments, DCM 74 may generate events/triggers to notify host application 72. As previously stated, host application 72 executing on host system 70 is an example of an external entity which issues commands to and receives responses from DCM 74.

According to an embodiment of the present invention, DCM 74 is host operation system independent and provides APIs which are also operation system independent. Accordingly, DCM 74 is portable to various network operating systems (NOSs). Consequently, DCM 74 along with its APIs 76 simplifies the integration of NP 10 with host system 70.

Figure 3A:
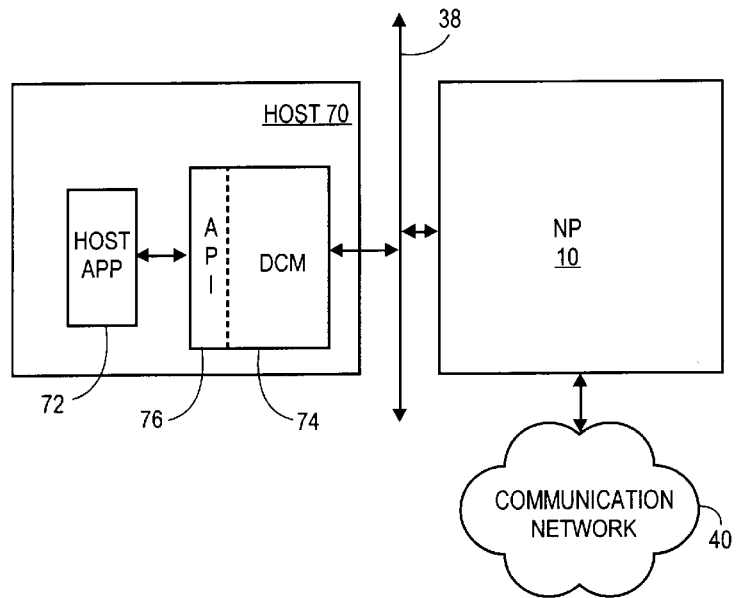
FIGS. 3A, 3B, 3C and 3D depict various ways in which a host system may interface with a network processor according to an embodiment of the present invention.
Figure 3B:
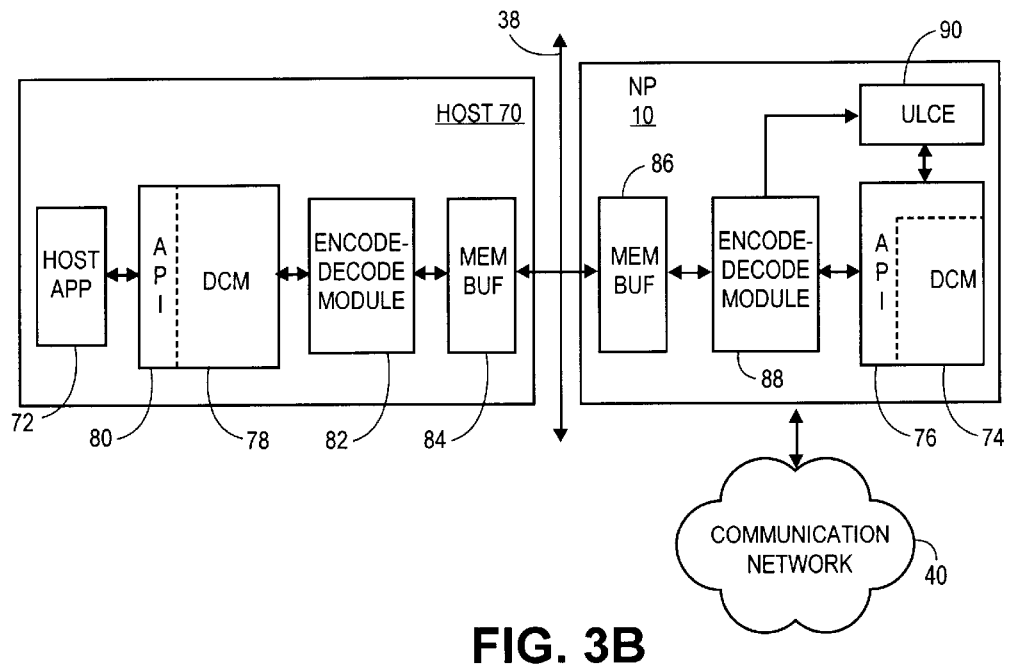

FIG. 3B depicts an alternative embodiment for interfacing host system 70 with NP 10. The configuration depicted in FIG. 3B is generally useful for integrating NP 10 with PCI based hosts. In this embodiment, DCM 74 executes on NP 10. Host application 72 issues commands to NP 10 using APIs 80 provided by an upper-level command module (ULCM) 78. ULCM APIs 80 provide a set of well defined programming interfaces that allow a host application to configure and monitor NP 10 in the control plane, and to send and receive LAN traffic in the data plane.

ULCM APIs 80 are intended to encapsulate as much as possible the underlying messaging between host system 70 and NP 10, and further to encapsulate the details associated with APIs provided by DCM 74. Accordingly, unlike DCM 74 which provides APIs for fine-grained control of NP 10, APIs 80 provided by ULCM 78 enable higher level control of NP 10. In one embodiment of the present invention, ULCM APIs 80 can be mapped to one or more DCM APIs 76. ULCM APIs 80 can accordingly be modified to customize the functionality of NP 10 without making changes to the lower level APIs 76 provided by DCM 74 in different host environments. This increases the compatibility of the present invention across different networking host environments and network operating systems. In one embodiment, ULCM 78 provides high level software for performing various functions such as LAN emulation over ATM, classical IP over ATM, MPOA, and MPLS. For example, if host 70 needs to provide an ATM up-link for a gigabit router, ULCM 78 provides LAN emulation APIs to provide the functionality.

In one embodiment of the present invention, commands issued by host application 72 by using ULCM APIs 80 are processed by ULCM 78 and then forwarded to encode-decode module 82. Encode-decode module 82 encapsulates the commands into memory structures or messages and writes the memory structures to memory buffers 84 or 86. Memory buffers 84 and 86 facilitate exchange of information between host system 70 and NP 10 across a PCI bus 38 interface. In one embodiment the message buffers enable asynchronous communication between host 70 and NP 10. The memory structures may be written to memory buffer 86 by host 70, or alternatively, the memory structures may be written to memory buffer 84 and then forwarded to memory buffer 86.

Encode-decode module 88 in NP 10 then reads the memory structures corresponding to the commands either from memory buffers 84 or 86. Encode-decode module 88 may then decode the memory structures and make calls to appropriate DCM APIs 76. DCM 74 then processes the commands and forwards the commands to subsystems of NP 10 for execution. Alternatively, encode-decode module 88 may decode the memory structures and make calls to upper level control engine (ULCE) 90. ULCE 90 performs processing for functions of upper protocol layers. ULCE 90 may perform processing by calling one or more APIs 76 of DCM 74.

Responses to the commands, if any, received by DCM 74 may be forwarded to encode-decode module 88 which encapsulates the responses into memory structures or messages and writes the memory structures to the memory buffers 84 or 86. These encapsulated responses may then be read by encode-decode module 82 on host 70 and then forwarded to host application 72 via ULCM 78.

The memory buffers illustrate an exemplary mechanism for communicating information between host system 70 and NP 10. It should be apparent to one of ordinary skill in the art that alternate mechanisms for exchanging information between host system 70 and NP 10 are also within the scope of the present invention.

Figure 3C:
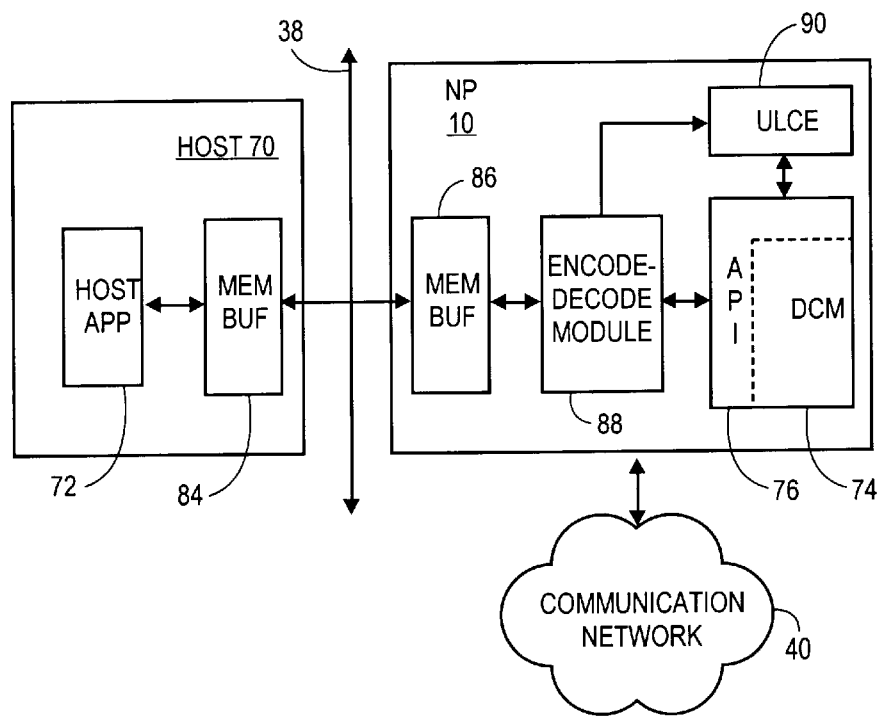

The embodiment depicted in FIG. 3C is similar to the embodiment shown in FIG. 3B except that host application 72 writes the memory structures encapsulating the commands directly into memory buffer 84 or 86. This embodiment allows host applications to exercise very fine-grained control over NP 10. In this embodiment, the function of encoding and decoding the command/response memory structures is performed by host application 72. This kind of configuration is generally useful for integrating NP 10 with proprietary switches.

Figure 3D:
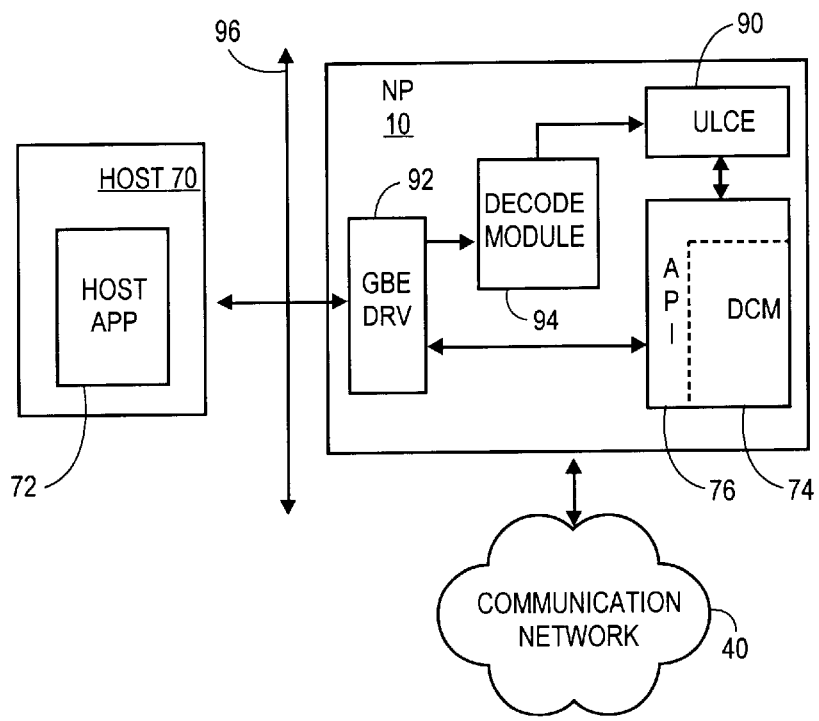

In the embodiment depicted in FIG. 3D, host system 70 is coupled with NP 10 via a Gigabit Ethernet Interface (GBE) 96. This type of configuration is generally useful for integrating NP 10 with GBE switches. In this embodiment, host application 72 and NP 10 communicate with each other via the GBE interface using in-band messaging. In this embodiment, a GBE device driver 92 generally executes on NP 10 and receives commands issued by host application 72. GBE device driver 92 may then call the appropriate APIs provided by DCM 74 or alternatively may forward the command to decode module 94. Decode module 94 may decode the commands and make calls to upper level control engine (ULCE) 90. ULCE 90 may perform processing by calling one or more APIs 76 of DCM 74.

FIGS. 4A through 4C depict the various upper layer software protocol stacks that may utilize APIs 76 provided by DCM 74. FIG. 4A depicts a LAN Emulation (LANE) stack comprising an LLC or Bridging Relay layer, a LAN emulation layer, and connection management layer. FIG. 4B depicts a classical internet protocol (IP) over ATM protocol stack comprising an IP layer, a RFC 1577 layer, and a connection management layer. FIG. 4C depicts a multi-protocol over ATM (MPOA) protocol stack comprising an internetworking protocol layer, a MPOA/LANE layer, and a connection management layer. As shown in FIGS. 4A–4C, NP 10 may be coupled with a dual or quad OC3 physical device 98.

In one embodiment of the present invention APIs 80 provided by ULCM 78 allow a host application to perform functions corresponding to the upper layer software protocol stacks as depicted in FIGS. 4A–4C. In this embodiment, the functions corresponding to the upper layer protocol stack functions are accomplished by ULCE 90 using the APIs 76 provided by DCM 74, as shown in FIGS. 3B, 3C, and 3D.

As previously stated, according to embodiments of the present invention, communication of commands and responses between host system 70 and NP 10 is facilitated by message buffers provided by host 70 and NP 10. The commands and responses are encapsulated into memory structures or messages which are written to and read from the memory buffers. Memory structures encapsulating the commands are usually written to the memory buffers by host application 72 and read from the memory buffers by DCM 74. In alternate embodiments, command memory structures may also be written by DCM 74 and read by host application 72. Response messages are generally written by DCM 74 and read by host application 72.

Figure 5:
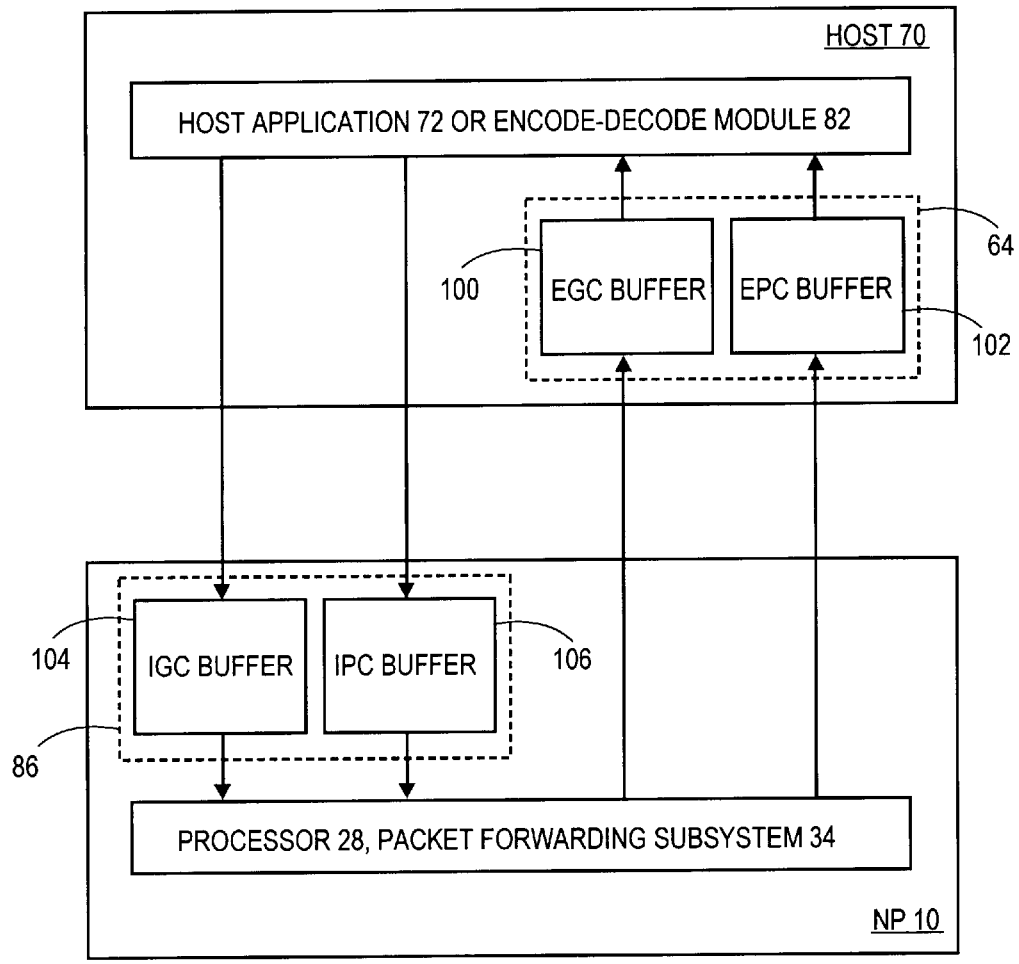
FIG. 5 depicts a simplified block diagram of memory buffers provided by a host system and a network processor for exchanging information according to an embodiment of the present invention.

FIG. 5 depicts a simplified block diagram of memory buffers 84 and 86 according to an embodiment of the present invention. As shown, memory buffers 84 and 86 may include four memory buffers 100, 102, 104, and 106 which are used for communicating messages between host 70 and NP 10. Memory buffer 86 may include two ingress buffers 104 and 106, while memory buffer 84 may include two egress buffers 100 and 102. In order to achieve a high packet throughput and device performance, ingress buffers 104 and 106 reside within the memory (typically SSRAM) address space of NP 10, while egress buffers 100 and 102 reside in the PCI address space on host 70. In order to achieve peak line rates, separate buffers are used for packet transfer commands and general commands since the packet transfer commands, unlike the general commands, are not processed by processor 28 on NP 10 but are processed by packet forwarding subsystem 34.

As shown in FIG. 5, the four memory buffers include an ingress general command buffer (IGC) 104, an ingress packet command buffer (IPC) 106, an egress general command buffer (EGC) 100, and an egress packet command buffer (EPC) 102. IGC 104 and IPC 106 message buffers are used to convey messages from host processor to NP 10, while EGC 100 and EPC 102 memory buffers are used to convey messages from NP 10 to host 70. As previously stated, memory buffers IPC 106 and IGC 104 are located in the memory space of NP 10, and memory buffers EPC 102 and EGC 100 are located in PCI memory space on host 70. In one embodiment, the four memory buffers are implemented as circular memory rings. Pointers are maintained by host 70 and NP 10 to ensure that no unprocessed memory structure gets overwritten and no unwritten memory structure is processed.

Figure 6:
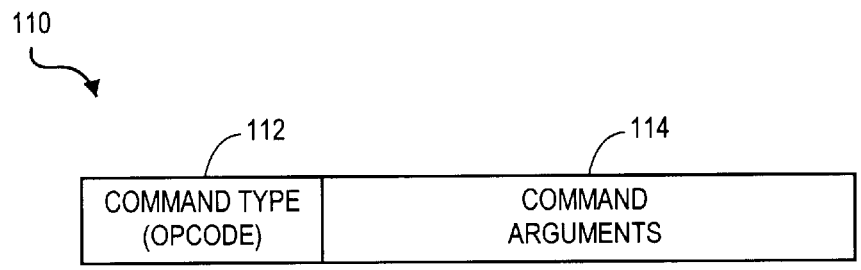
FIG. 6 depicts an exemplary memory structure used for encapsulating a command written to the memory buffers according to an embodiment of the present invention.

FIG. 6 depicts an exemplary memory structure 110 which may be used for encapsulating a command and which is written to the memory buffers. Memory structure 110 includes a first section 112 which stores the command type, and a second section 114 which stores arguments of the corresponding command. In one embodiment, command type section 112 stores the opcode for the command. Command argument section 114 is of variable length depending on the type of command. An argument count indicating the number of arguments for the command in section 112 is typically included in section 114.

According to an embodiment of the present invention, memory structures are written to the IGC buffer 104 for the following commands: (1) reset engine; (2) initialize engine; (3) configure buffer management; (4) open virtual circuit (VC); (5) close VC; (6) get statistics; (7) update EGC read pointer; and (8) update EPC read pointer.

According to an embodiment of the present invention, memory structures are written to the EGC buffer 100 for the following commands: (1) EGC nop; (2) reset complete; (3) initialize complete; (4) configure buffer response; (5) open VC confirm; (6) close VC confirm; (7) VC statistic results; (8) update IGC read pointer; and (9) update IPC read pointer.

According to an embodiment of the present invention, memory structures are written to the IPC buffer 106 for the following commands: (1) add packet; (2) add buffer; and (3) receive (Rx) buffer return.

According to an embodiment of the present invention, memory structures are written to the EPC buffer 102 for the following commands: (1) EPC nop; (2) Rx packet indication; and (3) transmit (Tx) buffer return. For further details on the functionality of memory buffers and for descriptions of the memory structure formats for the various commands listed above, please refer to Appendix A which has been attached to this application.

As described above, the present invention provides two sets of APIs 76 and 80 for controlling the functionality of NP 10. APIs 80 provided by ULCM 78 are described in patent application Ser. No. _/_ ,_, entitled "SYSTEM AND METHOD FOR CONTROLLING A NETWORK PROCESSOR" (Attorney Docket No. 19148-001300US) filed concurrently with the present application and assigned to a common assignee, the entire disclosure of which is herein incorporated by reference for all purposes. This application describes APIs 76 provided by DCM 74 which allow a host application to exercise fine-grained device level control of NP 10. Examples of the functions performed via the APIs include but are not limited to diagnostic functions, configuration functions, initialization functions, statistics gathering functions, interrupt handling, status and error monitoring functions, functions for managing physical layer hardware devices connected to NP 10 such as single OC12, dual OC3, or quad OC3 devices, and several other functions supported by NP 10.

As previously stated, APIs 76 provided by DCM 74 allow a host to control NP 10 and facilitate integration of NP 10 with host applications. APIs 76 also allow higher layer software, such as LANE protocol stack, and Classical IP over ATM protocol stack, to issue commands to NP 10. APIs 76 relieve the host application from performing low level functions such as packet header generation, which is performed by NP 10. For example, in LANE v2, the LANE layer is conventionally responsible for adding the logical link control (LLC)/SNAP, ELAN ID, LEC ID, MAC headers. However, according to the present invention, these headers may now be encapsulated by the subsystems of NP 10 by making appropriate calls to DCM APIs 76. This presents a substantial saving in PCI bus bandwidth consumption required to encapsulate the header frames.

According to the present invention, DCM APIs 76 can be grouped into the following categories based on the functions performed by the APIs. However, these categories are not intended to in any manner limit the scope of the present invention. The categories include APIs related to: (1) reset functions; (2) initialization functions; (3) buffer management functions; (4) functions related to opening and closing of virtual channels (VCs); (5) dynamic memory access (DMA) functions; and (6) functions for receiving and transmitting packets. The APIs for each of the categories are listed and described below.

1) Reset APIs

According to the present invention several APIs are provided to perform reset operations on the various subsystems within processing engine subsystem 16. In an embodiment of the present invention, these APIs include:

(a) void $dcm_{13}$ ResetPEModule$_{13}$ LM(void)

This API allows host application 72 to reset the local memory module 42 within processing engine subsystem 16.

(b) void $dcm_{13}$ ResetPEModule$_{13}$ RX(void)

This API allows host application 72 to reset the receiver module 62 within processing engine subsystem 16.

(c) void $dcm_{13}$ ResetPEModule$_{13}$ TX(void)

This API allows host application 72 to reset the transmitter module 64 within processing engine subsystem 16.

(d) void $dcm_{13}$ ResetPEModule$_{13}$ DMA(void)

This API allows host application 72 to reset the DMA module 46 within processing engine subsystem 16.

(e) void dcm__ResetPEModule__ALL(void)

This API allows host application 72 to reset the local memory 42, receiver 62, transmitter 64, and DMA 46 modules within processing engine subsystem 16.

2) Initialization APIs

According to the present invention several APIs are provided to initialize the various subsystems of processing engine subsystem 16 and NP 10. These APIs typically use the parameters stored in a configuration file, such as a "config.h" file. An example of a "config.h" file is shown in Appendix B.

(a) void dcm__LocalInit(void)

This API allows initialization of the DCM data structures local to processor 28.

(b) void dcm__PEInit(void)

This API allows initialization of the registers and RAMs within processing engine subsystem 16.

(c) void dcm__AddrMapInit(
U64 SePciAddrBase, U64 SePciAddrMask,
U32 CpuPktMemBase, U32 CpuPktMemMask,
U32 CpuCtrlMemBase, U32 CpuCtrlMerMask,
U32     CpuLmCtrlMemBase,     U32 CpuLmCtrlMemMask,
U32 SePktMemBase, U32 SePktMemMask,
U32 SeCtriMemBase, U32 SeCtrlMemMask
)

This API instructs DCM 74 how to map a memory from one master's perspective to another master's perspective. The memory map as seen by processing engine subsystem 16 are physical addresses, while the memory map as seen by processor 28 are virtual addresses. "SePciAddrBase" parameter indicates the PCI base address of processing engine subsystem 16. This allows processor 28 to re-map a memory location to the processing engine subsystem's perspective for programming the DMA. "SePciAddrMask" indicates the address mask of processing engine subsystem 16 used for re-mapping the PCI address. "CpuPktMemBase" indicates the processor packet memory base. This allows processor 28 to re-map a packet buffer to it's own perspective for processing. "CpuPktMemMask" indicates the processor packet memory mask used in re-mapping the packet buffer to the processor's perspective. "CpuCtrlMemBase" indicates the processor control memory base. This allows processor 28 to re-map control memory to it's own perspective for processing. "CpuCtrlMemMask" indicates the processor packet memory mask used in re-mapping the control memory to the processor's perspective.

Parameter "CpuLmCtrlMemBase" indicates the processor local memory control memory base which allows processor 28 to re-map control memory in local memory to it's own perspective for processing. "CpuLmCtrlMemMask" indicates the processor packet memory mask used in re-mapping the control memory in local memory to the processor's perspective. "SePktMemBase" indicates the processing engine subsystem 16 packet memory base which allows the processor to re-map a packet buffer to processing engine subsystem's 16 perspective for processing. "SePktMemMask" indicates the processing engine subsystem 16 packet memory mask used in re-mapping the packet buffer to processing engine subsystem's perspective. "SeCtrlMemBase" indicates the processing engine subsystem 16 control memory base which allows processor 28 to re-map control memory to processing engine subsystem's perspective for processing. "SeCtrlMemMask" indicates the processing engine subsystem 16 packet memory mask used in re-mapping the control memory to processing engine subsystem's perspective.

3) Buffer Management APIs

According to the present invention several APIs are provided for managing the local memory buffer transmit and receive pools. The transmit and receive buffers are in the local memory, while the transmit and receive pools are stored in memory subsystem 30. In one embodiment of the present invention these APIs may include:

(a) void dcm__LocalTxBufInit(void)

A call to this API initializes the local memory transmit (Tx) free buffer pool. The sizes and number of buffers are configurable in a configuration file, such as the "config.h" header file. Refer to Appendix "B" for an example of a configuration file.

(b) U64 dcm__GetLocalTxBuf(int BufSize)

A call to this API allows host application 72 to get a Tx Buffer of size "BufSize" from the appropriate free buffer pool. This API returns the address of the free Tx buffer. The "BufSize" parameter may indicate various buffer sizes. For example, a first value of "BufSize" may indicate 256 bytes, a second value may indicate 512 bytes, a third value may indicate 1024 bytes, and a fourth value may indicate 2048 bytes.

(c) void dcm__RetLocalTxBuf(U64 BufAddr,int BufSize)

A call to this API returns the Tx Buffer to the appropriate free buffer pool according to the buffer size. Parameter "BufAddr" indicates the address in the local memory space of the transmit buffer to be returned. The "Bufsize" parameter may indicate various buffer sizes as previously described in section 3(b).

(d) void dcm__AddGetHostBufFunct(U32 *GetHostBuf)

A call to this API links the dcm__GetHostBuf to the GetHostBuf function that host 70 provides so that DCM 74 can get a host buffer when needed. Parameter "U32 *GetHostBuf(int BufSize)" is a function that is provided by host 70.

(e) void dcm__AddRetHostBufFunct(void *RetHostBuf)

A call to this API links the dcm__RetHostBuf to the RetHostBuf function provided by host 70 so that DCM 74 can return a host buffer when needed. Parameter "void *RetHostBuf(U32 BufAddr, int BufSize)" is a function provided by host 70.

(f) void dcm__AddRetTxBufFunct(void *RetTxBuf)

A call to this API links the dcm__RetTxBuf to the RetTxBuf function provided by host 70 so that DCM 74 can return a Tx buffer when needed. Parameter "void *RetTxBuf(U32 BufAddr, int BufSize)" is a function provided by host 70.

(g) void dcm__RetPERxBuf(U32 BufAddr, int PoolId)

This API returns the receive (Rx) buffer to the processing engine subsystem 16 receive pool bit map. Parameter "BufAddr" indicates the buffer address as reported in the status report. The status report is generated by processing engine subsystem 16 and stored either in the local memory or in the PCI memory. "PoolId" identifies the pool identifier as reported in the status report which allows processing engine subsystem 16 to return the buffer to the appropriate bit map.

4) Opening and Closing of VCs APIs

According to the present invention several APIs are provided for obtaining VC descriptor numbers given the VPI/CI and the port number and vice-versa. In an embodiment these APIs include:

(a) U32 dcm__GetVcDesc(int VcNumber, int PortNo)

This API returns a transmit VC descriptor number based on a VC Number (VCI/VPI) and the physical port number. Parameter "VcNumber" indicates the actual VPI and VCI number of the transmitted or received packet in the ATM Header. "PortNo" indicates the physical port on which the packet is transmitted or received.

(b) void dcm__GetVcPortNumber(U32 VcDesc, int *VcNumber, int *PortNo)

This API returns the VC Number (VCINVPI) and the physical port number of a VC descriptor. Parameter "VcDesc" indicates the VC descriptor number for which the VC Number and the associated physical port number are returned.

(c) U32 dcm__GetRxVcDesc(int VcNumber, int PortNo)

This API returns a receive (RX) VC descriptor based on a VC number (VCI/VPI) and the physical port number. Parameter "VcNumber" indicates the actual VPI and VCI number of the transmitted or received packet in the ATM Header. "PortNo" indicates the physical port on which the packet is transmitted or received.

(d) STATUS dcm__OpenTxVC__UBR($t_{13}$ AtmHeader ATM__Header, int PortNo, int CPCS__UU, int CPI)

This API allows a host application to initialize a transmit (TX) VC descriptor for unspecified bit rate (UBR) traffic. The "STATUS" return field indicates SUCCESS or ERROR. Parameter "ATM Header" is the ATM header of the VC's data cells. The PT field of the header will be updated appropriately by the processing engine subsystem 16 for different payload types. "Port No" indicates the port number in Dual OC-3 MPHY or OC-12-noMPHY configuration. In one embodiment 4 ports are supported. "CPCS-UU" indicates the CPCS-UU fields of AAL5 trailer. "CPI" indicates the CPI fields of AAL5 trailer.

(e) STATUS dcm__OpenTxVC__CBR(t__AtmHeader ATM__Header, int PortNo, int AAL, int CPCS__UU, int CPI, int PCR)

This API allows a host application to initialize a TX VC Descriptor for constant bit rate (CBR) traffic. The "STATUS" return field indicates SUCCESS or ERROR of the API. Parameter "ATM Header" is the ATM header of the VC's data cells. The PT field of the header will be updated appropriately by processing engine subsystem 16 for different payload types. "Port No" indicates the port number in MPHY configuration. "AAL Type" indicates the AAL type of the VC. For example, a value of 0×0 may indicate AAL5, 0×1 may indicate AAL3/4, 0×2 may indicate AAL1, 0×3 may indicate AAL0. "CPCS-UU" indicates the CPCS-UU fields of AAL5 trailer. "CPI" indicates the CPI fields of AAL5 trailer. "PCR" indicates the peak cell rate.

(f) STATUS dcm__OpenTxVC__VBR($t_{13}$ Atm Header ATM__Header, int PortNo, int AAL, int CPCS__UU, int CPI, int PCR, int SCR, int MBS)

This API allows a host application to initialize a TX VC Descriptor for variable bit rate (VBR) traffic. "STATUS" returns SUCCESS or ERROR. The "ATM Header," "Port No," "AAL Type," "CPCS-UU," "CPI" and "PCR" parameters are as previously described in section 4(e). "SCR" indicates the sustainable cell rate. "MBS" indicates the maximum burst size (MBS).

(g) STATUS dcm__OpenRxVC(t__AtmHeader ATM__Header, int PortNo, int Mode, int AAL, int InterfaceAddr)

This API initializes a RX VC Descriptor. "STATUS" returns SUCCESS or ERROR. The "ATM Header," and "Port No" parameters are as previously described in section 4(e). "Mode" indicates the packet format of the Rx packets during segmentation. (The Tx packets' mode will be decided on a per packet basis). The modes may include Raw ATM, AAL5 with LLC/SNAP, or LANE. "AAL Type" indicates the AAL type of the VC which may include AAL5, AAL3/4, AAL1, or AAL0. "Interface Address" indicates the tagging for receive VC lookup.

(h) STATUS dcm_CloseTxVC_UBR(U32 VCDesc, int Level)

This API closes a UBR TX VC. "STATUS" returns SUCCESS or ERROR status of the operation. "VCDesc" indicates the VC Descriptor value returned in the dcm_GetTxVcDesc( ) call. "Level" indicates the action before closing a VC. For example, a Level 0 may indicate that the VC will be closed cleanly, waiting for all buffers in the queue to transmit before shutting down the VC. DCM 74 ensures that all of the packets queued for the VC will be transmitted before shutting the VC down.

A Level 1 may indicate that the VC is closed regardless of whether there are packets waiting for transmission. In other words, packets queued within the transmitter will not be transmitted and the VC will be shut down irnmediately. For packets residing within the host memory during the segmentation process, DCM 74 will return a list of the buffer pointers for the packet that are not transmitted. In the event of local segmentation, the pointers are returned into the transmit buffer pointer pool within NP 10.

(i) STATUS dcm_CloseTxVC_CVBR(U32 VCDesc, int Level)

This API closes a CBR/VBR TX VC. "STATUS" returns a SUCCESS or ERROR based on the operation completion. "VCDesc" indicates the VC descriptor value returned in the dcm_GetTxVcDesc( ) call. The "Level" parameter has been described in section 4(h) above.

(j) STATUS dcm_CloseRxVC(U32 VCDesc)

This API closes a RX VC. "STATUS" returns a SUCCESS or ERROR based on the operation completion. "VCDesc" indicates the VC descriptor value returned in the dcm_GetTxVcDesc( ) call.

5) DMA APIs

According to the present invention several APIs are provided for performing DMA operations. These operations may include, for example, saving packet information needed by DCM 74 to transmit a packet after the completion of the DMA. In one embodiment these APIs include:

(a) void dcm_AddPacket_SaveInfo(int DmaId, int AddPacketType, U64 PciBufAddr, U32 BufAddr, U32 BufSize, U32 PktLength, U32 VcDesc,U32 Header)

A call to this API saves the information for the "addpacket" command.

This API is used when a DMA is necessary before the "addpacket" command is issued to processing engine subsystem 16. This ensures that the data is completely DMAed before the "addpacket" is done. Parameter "DmaId" is the return value from dcm_ProgramDMA( ). "AddPacketType" is the return value from dcm_AddPacketType( ). "PciBufAddr" indicates the address of the buffer in the PCI space. "BufAddr" indicates the address of the buffer in the local memory space or PCI as indicated by "PciBufAddr." "BufSize" indicates the size of the buffer such as 256 bytes, 512 bytes, 1024 bytes, and 2048 bytes. "PktLength" indicates the length of the packet. "VcDesc" is the return value from dcm_GetTxVcDesc( ). "Header" indicates the type of transmit packet encapsulation and depends on the packet type encoding. "Header" may indicate NONE, LECID or LLC/SNAP.

(b) int dcm_ProgramDMA(U64 PciAddr, U64 LmAddr, U16 DmaSize, U16 DmaDir, U8 PoolId, U8 RtrFlag, int SwapData)

A call to this API programs the processing engine subsystem 16 DMA. If the DMA queue is full, this API waits until it is not full and then programs it. The functions returns the DMA ID of the programmed DMA. Parameter "PciAddr" indicates the address in the PCI space to DMA into or out of. "LmAddr" indicates the address in the local memory space to DMA into or out of. "DmaSize" indicates the number of bytes to DMA. "DmaDir" indicates the direction of the DMA, for example, PCI to local memory or local memory to PCI. "PoolId" indicates the identifier to return the buffer to if the RtrFlag is set. "RtrFlag" when set, indicates that the DMA should return the buffer to the PoolId. "SwapData" when set, indicates to swap data to Big Endian or Little Endian based on the setting in the control register.

(c) void dcm_ProcessDMA(void)

A call to this API checks for completed DMA and does post-processing as appropriate.

6) Transmit and Receive Packets APIs

According to the present invention several APIs are provided for handling receive and transmit packets, receive and transmit reports, and for sending different types of buffers in the case of a multi-buffer packet. Processing engine subsystem 16 transmitter packet accelerator state machine is able to attach several tagging combination preceding the packet. The different packet formats may include Raw ATM, AAL5 with LLC/SNAP, LANE (version 1 and 2), MPOA, and MPOA without Tag. In one embodiment these APIs include:

(a) int dcm_ProcessTxRing(int NumEntries)

A call to this API processes "NumEntries" in the transmit status report ring. Parameter "NumEntries" indicates the number of entries in the Transmit Status Report ring to be processed.

(b) int dcm_ProcessRxRing(int NumEntries)

A call to this API processes "NumEntries" in the Rx Status Report Ring.

Parameter "NumEntries" indicates the number of entries in the Receive Status Report ring to be processed.

(c) STATUS dcm_AddPacket_ALL(int AddPacketType, U32 BufAddr, U32 BufSize, U32 PktLength, U32 VCDesc, U32 Header);

This API performs an "addpacket" command to the processing engine subsystem 16 base on the encoded "AddPacketType" passed in parameter. "STATUS" returns a SUCCESS or ERROR based on the command completion status. "AddPacketType" indicates the encoding of packet type and may be the return value of dcm_AddPacketType( ) API call. "BufAddr" indicates the address in the PCI or local memory space where processing engine subsystem 16 should start the segmenting process. "BufSize" indicates the buffer size, for example, a 0 may indicate 256 bytes, a 1 may indicate 512 bytes, a 2 may indicate 1024 bytes, and a 3 may indicate 2048 bytes. "PktLength" indicates the two byte Packet Length field which specifies the length of the packet in bytes. Processing engine subsystem 16 provides a capability for devices that do not know the Packet Length at the beginning of the process. When a packet spreads across multiple buffers and the Packet Length is not known yet, it is okay to provide an incorrect Packet Length and to update this field later during the buffer add command for the same packet. "VCDesc" is the return value from dcm_GetTxVcDesc( ) API. "Header" is for transmit packet encapsulation and depends on the packet type encoding which could be NONE, LECID or LLC/SNAP. If the type is "LECID," 2 bytes are used as LECID. These fields are appended to the beginning of the packet on its way out. If "LLC/SNAP," the LLC/SNAP type field is used to indicate whether the packet should be LLC/SNAP encapsulated. The LLC/SNAP value is actually generated internal to processing engine subsystem 16 which eliminates any memory accesses. In one embodiment, there are 12 programmable registers internal to the processing engine subsystem 16 which are programmed during the initialization phase. The LLC/SNAP field is used as an index to these internal register sets. The LLC/SNAP type is encoded.

(d) STATUS dcm_AddPacket_LM$_{13}$ ATM(U32 BufAddr, U32 BufSize, U32 PktLength, U32 VCDesc)

This API issues an addpacket command to processing engine subsystem 16 with packet type Local Memory, ATM. "STATUS" returns a SUCCESS or ERROR based on the command completion status. The "BufAddr," "BufSize," "PktLength," and "VCDesc" have been described in 6(c).

(e) STATUS dcm_AddPacket_LM_ATM_EOP(U32 BufAddr, U32 BufSize, U32 PktLength, U32 VCDesc)

This API issues an addpacket command to processing engine subsystem 16 with packet type Local Memory, ATM, EOP. "STATUS" returns a SUCCESS or ERROR based on the command completion status. The "BufAddr," "BufSize," "PktLength," and "VCDesc" have been described in 6(c).

(f) STATUS dcm_AddPacket_PCI_ATM(U32 BufAddr, U32 BufSize, U32 PktLength, U32 VCDesc)

This API issues an addpacket command to processing engine subsystem 16 with packet type PCI Memory, ATM. "STATUS" returns a SUCCESS or ERROR based on the command completion status. The "BufAddr," "BufSize," "PktLength," and "VCDesc" have been described in 6(c).

(g) STATUS dcm_AddPacket_PCI_ATM_EOP(U32 BufAddr, U32 BufSize, U32 PktLength, U32 VCDesc)

This API issues an addpacket command to processing engine subsystem 16 with packet type PCI Memory, ATM, EOP. "STATUS" returns a SUCCESS or ERROR based on the command completion status. The "BufAddr," "BufSize," "PktLength," and "VCDesc" have been described in 6(c).

(h) STATUS dcm_AddPacket_LM_LANEv1(U32 BufAddr, U32 BufSize, U32 PktLength, U32 VCDesc, U32 LECID)

This API issues an addpacket command to processing engine subsystem 16 with packet type Local Memory, LANEv1. "STATUS" returns a SUCCESS or ERROR based on the command completion status. The "BufAddr," "BufSize," "PktLength," and "VCDesc" have been described in 6(c). "LECID" indicates the LED identifier field which is appended to the beginning of the packet on its way out.

(i) STATUS dcm_AddPacket_LM_LANEv1_EOP (U32 BufAddr, U32 BufSize, U32 PktLength, U32 VCDesc, U32 LECID)

This API issues an addpacket command to processing engine subsystem 16 with packet type Local Memory, LANEv1, EOP. "STATUS" returns a SUCCESS or ERROR based on the command completion status. The "BufAddr," "BufSize," "PktLength," and "VCDesc" have been described in 6(c). The "LECID" parameter is described in section 6(h).

(j) STATUS dcm_AddPacket_PCI_LANEv1(U32 BufAddr, U32 BufSize, U32 PktLength, U32 VCDesc, U32 LECID)

This API issues an addpacket command to processing engine subsystem 16 with packet type PCI Memory, LANEv1. "STATUS" returns a SUCCESS or ERROR based on the command completion status. The "BufAddr," "BufSize," "PktLength," and "VCDesc" have been described in section 6(c). The "LECID" parameter is described in section 6(h).

(k) STATUS dcm_AddPacket_PCI_LANEv1_EOP (U32 BufAddr, U32 BufSize, U32 PktLength, U32 VCDesc, U32 LECID)

This API issues an addpacket command to processing engine subsystem 16 with packet type PCI Memory, LANEv1, EOP. "STATUS" returns a SUCCESS or ERROR based on the command completion status. The "BufAddr," "BufSize," "PktLength," and "VCDesc" have been described in section 6(c). The "LECID" parameter is described in section 6(h).

(l) int dcm_AddPacketType(int PciBuffer, int Mode, int EOP)

This API returns the type of packet to be added to the processing engine subsystem 16 base as per the input parameters the location, Mode and EOP (m) STATUS dcm_AddBuffer_ALL(int AddBufferType, U32 BufAddr, U32 BufSize, U32 PktLength, U32 VCDesc)

This API issues an "addbuffer" command to processing engine subsystem 16 based on the encoded "AddBufferType" input parameter. "STATUS" returns a SUCCESS or ERROR based on the command completion status. "AddBufferType indicates the encoding of buffer type and is the return value of dcm_AddBufferType( ) API call. "BufAddr" indicates the address in the PCI or local memory space where processing engine subsystem 16 should start the segmenting process. "BufSize" indicates the buffer size, for example, a 0 may indicate 256 bytes, a 1 may indicate 512 bytes, a 2 may indicate 1024 bytes, and a 3 may indicate 2048 bytes. "PktLength" indicates the two byte Packet Length field which specifies the length of the packet in bytes. Processing engine subsystem 16 provides a capability for devices that do not know the Packet Length at the beginning. When a packet spreads across multiple buffers and the Packet Length is not known yet, it is okay to provide an incorrect Packet Length and to update this field later during the buffer add command for the same packet. "VCDesc" is the return value from dcm_GetTxVcDesco API.

(n) STATUS dcm_AddBuffer_LM(U32 BufAddr, U32 BufSize, U32 VCDesc)

This API issues an addbuffer command to processing engine subsystem 16 with buffer type Local Memory. "STATUS" returns a SUCCESS or ERROR based on the command completion status. The "BufAddr," "BufSize," and "VCDesc" have been described in section 6(m).

(o) STATUS dcm_AddBuffer_LM_EOP(U32 BufAddr, U32 BufSize, U32 VCDesc)

This API issues an addbuffer command to processing engine subsystem 16 with buffer type Local Memory, EOP. "STATUS" returns a SUCCESS or ERROR based on the command completion status. The "BufAddr," "BufSize," and "VCDesc" have been described in section 6(m).

(p) STATUS dcm_AddBuffer_LM_UPL_EOP(U32 BufAddr, U32 BufSize, U32 PktLength, U32 VCDesc);

This API issues an addbuffer command to processing engine subsystem 16 with buffer type Local Memory, Update Packet length, EOP. "STATUS" returns a SUCCESS or ERROR based on the command completion status. The "BufAddr," "BufSize," "PktLength," and "VCDesc" have been described in section 6(m).

(q) STATUS dcm_AddBuffer_LM_DROP(U32 BufAddr, U32 BufSize, U32 VCDesc)

This API issues an addbuffer command to processing engine subsystem 16 with packet type Local Memory, drop packet. "STATUS" returns a SUCCESS or ERROR based on the command completion status. The "BufAddr," "BufSize," and "VCDesc" have been described in section 6(m).

(r) STATUS dcm_AddBuffer_PCI(U32 BufAddr, U32 BufSize, U32 VCDesc)

This API issues an addbuffer command to processing engine subsystem 16 with packet type PCI Memory. "STATUS" returns a SUCCESS or ERROR based on the command completion status. The "BufAddr," "BufSize," and "VCDesc" have been described in section 6(m).

(s) STATUS dcm_AddBuffer_PCI_EOP(U32 BufAddr, U32 BufSize, U32 VCDesc)

This API issues an addbuffer command to processing engine subsystem 16 with packet type PCI Memory, EOP. "STATUS" returns a SUCCESS or ERROR based on the command completion status. The "BufAddr," "BufSize," and "VCDesc" have been described in section 6(m).

(t) STATUS dcm_AddBuffer_PCI_UPL_EOP(U32 BufAddr, U32 BufSize, U32 PktLength, U32 VCDesc)

This API issues an addbuffer command to processing engine subsystem 16 with packet type PCI Memory, update packet length, EOP. "STATUS" returns a SUCCESS or ERROR based on the command completion status. The "BufAddr," "BufSize," "PktLength," and "VCDesc" have been described in section 6(m).

(u) STATUS dcm_AddBuffer_PCI_DROP(U32 BufAddr, U32 BufSize, U32 VCDesc)

This API issues an addbuffer command to processing engine subsystem 16 with packet type PCI Memory, drop packet. "STATUS" returns a SUCCESS or ERROR based on the command completion status. The "BufAddr," "BufSize," and "VCDesc" have been described in section 6(m).

(v) int dcm_AddBufferType(int PciBuffer, int Drop, int UpdateLength, int EOP)

This API provides the Buffer Type encoding that is later used to send a buffer. This API returns the type of buffer to be added to processing engine subsystem 16 location, Drop, Update Packet Length, and EOP parameters.

(w) void dcm_AddRxPacketIndFunct(void *RxPacketInd)

This API is a call back function that the host application needs to fill in and is called by DCM 74 when a complete packet is received. A call to this API links the dcm_RxPacketInd (internal DCM function) to the RxPacketInd function that host 70 provides so that DCM 74 can use this to pass the received packet to the application software. Parameter "RxPacketInd" is a callback function implemented by the host application and is of the form:

void *RxPacketInd(U32 BufAddr, * U32 BufSize, * U32 PktLength, int PoolId, int VcNumber, int PortNo)

"BufAddr" indicates the address of the received buffer in the PCI or local memory space. "BufSize" indicates the size of the received buffer which is the same as "PktLength" in case of a single buffer packet. "PktLength" indicates the packet length received. "PoolId" indicates the pool identifier where the buffer resides if in local memory space. "VcNumber: is the actual VPI and VCI number of the transmitted or received packet in the ATM Header. "PortNo" is the physical port on which the packet is transmitted or received.

(x) void dcm_AddRx2TxPair(U32 RxVcDesc, U32 TxVcDesc)

A call to this API enters the Rx and Tx VC descriptor pair into a table for doing a loopback from Rx to Tx. This is for the scenario when external tester generates traffic and sends it to NP 10. NP 10 receives the packet and turns to back out to the Tx port to the tester.

(y) void dcm_ProcessRx2Tx(int BufLocation)

This API processes the Rx report and gets the buffer address. The API then sends that same buffer back out to the Tx port base on the pairing added using dcm_AddRx2TxPair. The API also processes the Tx report and returns the buffer through the dcm_RetTxBuf. The application software should return this buffer to the processing engine subsystem 16 since it is a Rx buffer.

EXAMPLES

The following examples show the manner in which the DCM API 76 may be used by host application 72 to control the functions of NP 10. These examples are merely illustrative a way in which DCM APIs 76 may be used and are not intended to limit the scope of the present invention. Further, these examples are not meant to limit the scope of the invention to particular scenarios or environments.

Example 1

To Transmit and Receive Data under the following scenario

1. DCM is running in the PCI Host space.

2. PVC setup on a known Physical Port.

3. Sending UBR traffic on the VC.

4. Sending and Receiving Single Buffer Packet only.

5. Mode is Raw ATM—therefore no tagging

6. AAL type =AAL5

7. Data is DMAed by processing engine subsystem 16 from the PCI memory to the local memory and vice-versa 8. Transmit and Receive Reports are configured to reside in the PCI memory in a configuration file such as "config.h" file.

Steps for accomplishing the above task according to an embodiment of the present invention:

Step 1—Reset and Initialization a) Setup config.h file appropriately. (Refer to Appendix "B" for an example of a configuration file)

b) Invoke reset API.
dcm_ResetPEModule_ALL(void);

c) Invoke
dcm_AddrMapInit(U64 SePciAddrBase, U64 SePciAddrMask, U64 CpuPktMemBase, U64 CpuPktMemMask,
U64 CpuCtrlMemBase, U64 CpuCtrlMemMask,
U64 CpuLmCtrlMemBase,
U64 CpuLmCtrlMemMask, U64 SePktMemBase,
U64 SePktMemMask, U64 SeCtrlMemBase,
U64 SeCtrlMemMask)

d) Invoke initialize API
dcm_LocalInit(void).

e) Invoke processing engine subsystem 16 initialization API:
dcm_PEInit(void).

Step 2—Buffer Management a) Invoke
dcm_LocalTxBufInit(void).

b) Invoke
dcm_AddGetHostBufFunct(void *RetHostBuf).

DCM 74 will use the function returned from this call to get buffer from the host pool.
  c) Invoke
     dcm_AddRetHostBufFunct(void *RetHostBuf).
  DCM 74 will return the sent buffer to the host buffer pool using the function supplied by the host in this call.
  d) Invoke
     dcm_AddRetTxBufFunct(void *dcm_RetLocalTxBuf).
  DCM 74 will return the sent buffer to the local memory pool using the function supplied by the host in this call.

Step 3—Provide host function pointer. This is for DCM 74 to send received packets to host 70.
  a) Invoke
     dcm_AddRxPacketIndFunct(void *RxPacketInd).

Step 4—Open Transmit and Receive VC.
  a) Invoke
     dcm_OpenTxVC_UBR(t_AtmHeader ATM_Header, int PortNo, int CPCS_UU, int CPI).
  b) Invoke
     dcm_OpenRxVc(t_AtmnHeader ATM_Header, int PortNo, int Mode, int AAL, int InterfaceAddr).

Step 5—Get Transmit VC Descriptor
  a) Invoke
     dcm_GetTxVcDesc(int VcNumber, int PortNo) which returns VC descriptor used in steps 9 and 14(a) below.

Step 6—Get Local memory Buffer for Transmit
  a) Invoke
     dcm_GetLocalTxBuf(int BufSize) which returns buffer address used in steps 7 and 9 (see below).

Step 7—DMA Transmit packet from PCI to Local Memory
  a) Invoke
     dcm_ProgramDMA(U64 PciAddr, U64 LmAddr, U16 DmaSize, U16 DmaDir, U8 PoolId, U8 RtrFlag, int SwapData).
  A call to this API returns the DmaId used in step 9. PoolId and RtrFlag are not used when DmaDir is from PCI to local memory.

Step 8—Get ADDPACKET type encoding
  a) Invoke
     dcm_AddPacketType(int PciBuffer, int Mode, int EOP).
  A call to his API returns AddPacket type encoding used in step 9.

Step 9—Save information for Post-DMA AddPacket
  a) Invoke
     dcm_AddPacket_SaveInfo(int DmaId, int AddPacketType,
     U64 PciBufAddr, U32 BufAddr,
     U32 BufSize, U32 PktLength,
     U32 VcDesc, U32 Header). "Header" is the encapsulation desired for the Transmit Packet and depends on the "AddPacketType" encoding which could be NONE, LECID or LLC/SNAP. NONE in this example.

Step 10—Process the completed DMA
  a) Invoke
     dcm_ProcessDMA(void).
  Once the DMA is complete DCM 74 will automatically do an ADDPACKET based on the information saved in step 9.
  b) DCM 74 will then return the PCI buffer back to the PCI buffer pool using the host supplied function in Step 2(c).

Step 11—Process Transmit Report Status Ring.
  a) Invoke
     dcm_ProcessTxRing(NumEntries)
  DCM 74 will return the transmit buffers to the memory pool using the host supplied function (see step 2(d)) after processing the transmit reports.

Step 12—Process Receive Report Status Ring
  a) Invoke
     dcm_ProcessRxRing(int NumEntries)
  b) If "config.h" file is configured for receive data to be DMAed from local memory to PCI, DCM 74 invokes the host provided function to obtain the PCI buffer for DMA (see step 2(b)).
  c) After the data is moved into the PCI memory, DCM 74 invokes
     dcm_RxPacketInd(U32 BufAddr, U32 BufSize, U32 PktLength, int PoolId, int VcNumber, int PortNo).
  This call back function needs to be provided by the host to process the buffer that has been copied into the PCI memory. This uses the function provided in step 3.

Step 13—Get Receive VC Descriptor.
  a) Invoke
     dcm_GetRxVcDesc(int VcNumber, int PortNo)
  A call to this API returns VC Descriptor used in step 14(b).

Step 14—Shut Down VC.
  a) Invoke
     dcm_CloseTxVC_CVBR(U32 VCDesc, int Level).
  b) Invoke
     dcm_CloseRxVC(U32 VCDesc).

Example 2

To Transmit and Receive Data under the Following Scenario

1. DCM 74 is running in the PCI Host space.
2. PVC setup on a known Physical Port.
3. Sending VBR traffic on the VC.
4. Sending and Receiving Single Buffer Packet only.
5. Mode is Raw ATM—therefore no tagging.
6. AAL type =AAL5.
7. Data is configured to be in the PCI memory i.e., Segmentation and Reassembly happens in the PCI memory.
8. Transmit and Receive Reports are configured to reside in the PCI memory in "config.h" file.

Steps for accomplishing the above tack according to an embodiment of the present invention:

Step 1—Reset and Initialization
  a) Setup "config.h" file appropriately. (Refer to Appendix "B" for an example of a configuration file)
  b) Invoke the API for resetting processing engine subsystem 16.
     dcm_ResetPEModule_ALL(void).
  c) Invoke
     dcm_AddrMapInit(U64 SePciAddrBase, U64 SePciAddrMask,
     U64 CpuPktMemBase, U64 CpuPktMemMask,
     U64 CpuCtrlMemBase, U64 CpuCtrlMemMask,
     U64 CpuLmCtrlMemBase,
     U64 CpuLmCtrlMemMask, U64 SePktMemBase,
     U64 SePktMernMask, U64 SeCtrlMemBase,
     U64 SeCtrlMemMask).

d) Invoke initialization API
   dcm_LocalInit(void).
e) Invoke processing engine subsystem 16 initialization API
   dcm_PEInit(void).

Step 2—Get Host buffer pool functions a) Invoke
   dcm_AddRetHostBufFunct(void *RetHostBuf).
DCM 74 will return the sent buffer to the host buffer pool using the function supplied by the host in this call.

Step 3—Provide host function pointer. This is for DCM 74 to send received packets to host 70.

a) Invoke
   dcm_AddRxPacketIndFunct(void *RxPacketInd).

Step 4—Open Transmit and Receive VC a) Invoke
   dcm_OpenTxVC_VBR(t_AtmHeader ATM_Header, int PortNo, int CPCS_UU, int CPI, int PCR int SCR, int MBS).
b) Invoke
   dcm_OpenRxVc(t_AtmHeader ATM_Header, int PortNo, int Mode, int AAL, int InterfaceAddr).

Step 5—Get Transmit VC Descriptor a) Invoke
   dcm_GetTxVcDesc(int VcNumber, int PortNo).
A call to this API returns the VC Descriptor used in step 6(b).

Step 6—Do an ADDPACKET a) Get a PCI buffer using host function
b) Invoke
   dcm_AddPacket_PCI_ATM_EOP(U32 BufAddr, U32 BufSize, U32 PktLength, U32 VCDesc).

Step 7—Process Transmit Report Status Ring a) Invoke
   dcm_ProcessTxRing(NumEntries).
DCM 74 returns the transmit buffers to the memory pool using the host supplied function (see step 2(a)) after processing the transmit reports.

Step 8—Process Receive Report Status Ring a) Invoke
   dcm_ProcessRxRing(int NumEntries).
b) DCM 74 invokes
   dcm_RxPacketInd(U32 BufAddr, U32 BufSize, U32 PktLength, int PoolId, int VcNumber, int PortNo).
This is a call back function that needs to be provided by the host to process the buffer that has been copied into the PCI memory. This uses the function provided in step 3.

Step 9—Return received Buffer to the processing engine subsystem 16 bit map pool a) Host 70 should invoke
   dcm_RetSeRxBuf(U32 BufAddr, int PoolId)
   inside the host provided call back function dcm_RxPacket_Ind( ) to return the buffer to processing engine subsystem 16. "PoolID" is known from step 8(b).

Step 10—Get Receive VC Descriptor a) Invoke
   dcm_GetRxVcDesc(int VcNumber, int PortNo).
A call to this API returns VC Descriptor used in step 11(b).

Step 11—Shut Down VC a) Invoke
   dcm_CloseTxVC_CVBR(U32 VCDesc, int Level).
b) Invoke
   dcm_CloseRxVC(U32 VCDesc)

Although specific embodiments of the invention have been described, various modifications, alterations, alternative constructions, and equivalents are also encompassed within the scope of this application. For example, the structure of network processor 10 is not limited to the embodiment shown in FIG. 1. Alternate configurations of network processor 10 having more or less subsystems than the embodiment depicted in FIG. 1 are also within the scope of the present invention. In other embodiments, the subsystems of network processor 10 may be combined into one or more subsystems or distributed across multiple subsystems. For example, memory subsystems 24 and 26 may be combined into one memory subsystem. Further, the names given to the subsystems do not in any way limit the functional scope of the subsystems. Likewise, the names given to the various APIs are not meant to in any manner reduce the scope of the functions performed by the APIs. Each API may have more or less parameters than those described above. Further, the data structure parameters to the APIs may also have more or less information than those described above. Further, the present invention is not limited to the APIs described above. Alternate embodiments of the present invention may provide more or less APIs than described above, or may provide APIs which are combinations or permutations of the APIs described above.

The described invention is not restricted to operation within certain specific data processing environments, but is free to operate within a plurality of data processing environments. Additionally, although the present invention has been described using a particular series of transactions and steps, it should be apparent to those skilled in the art that the scope of the present invention is not limited to the described series of transactions and steps.

Further, while the present invention has been described using a particular combination of hardware and software, it should be recognized that other combinations of hardware and software are also within the scope of the present invention. The present invention may be implemented only in hardware or only in software or using combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope of the invention as set forth in the claims.

What is claimed is:

1. In a network environment including a host system coupled to a work processor, the host system executing a host application program, a method for allowing the host application program to issue commands to the network processor, the method comprising:

providing a device control program, the device control program providing a plurality of application programming interfaces (APIs);

initiating invocation of a first API from the plurality of APIs from the host application program, the first API accepting a first parameter list and configured to perform a first function;

performing the first function at the network processor; and communicating a response from performing the first function from the network processor to the host application.

2. The method of claim 1 wherein the host system communicates with the network processor via a PCI interface.

3. The method of claim 1 wherein the network processor comprises a processing engine subsystem, and the first function resets a module of the processing engine subsystem, the module selected based on the first parameter list from a group of modules consisting of a local memory module, a receiver module, a dynamic memory access controller module, and a transmitter module.

4. The method of claim 1 wherein the network processor comprises a processing engine subsystem, and the first function initializes the processing engine subsystem.

5. The method of claim 1 wherein the network processor comprises a processing engine subsystem and a processor, and the first function instructs the device control program how to map memory addresses associated with the processing engine subsystem to memory addresses of the processor.

6. The method of claim 1 wherein the first function allocates a free buffer of a size indicated by a parameter in the first parameter list and returns an address of the allocated buffer to the host application.

7. The method of claim 1 wherein the first function returns a buffer indicated by a parameter in the first parameter list to a pool of free buffers.

8. The method of claim 1 wherein the first function determines a virtual channel descriptor based on a virtual connection number indicated by a first parameter in the first parameter list and a port number indicated by a second parameter in the first parameter list, and wherein the response comunicated to the host application includes the virtual channel descriptor.

9. The method of claim 1 wherein the first function determines a virtual connection number and a port number based on a virtual channel descriptor indicated by a parameter in the first parameter list, and wherein the response comunicated to the host application includes the virtual connection number and the port number.

10. The method of claim 1 wherein the first function initializes a transmit virtual channel descriptor for traffic of a particular service type based on parameters included in the first parameter list, wherein the particular service type is selectable from a group of service types consisting of unspecified bit rate (UBR) service, constant bit rate (CBR) service, and variable bit rate (VBR) service type.

11. The method of claim 1 wherein the first function initializes a receive virtual channel descriptor.

12. The method of claim 1 wherein the first function closes a receive virtual channel identified by a parameter in the first parameter list, the parameter indicating a virtual channel descriptor.

13. The method of claim 1 wherein the first function closes a transmit virtual channel for a particular service type based on parameters included in the first parameter list, wherein the particular service type is selectable from a group of service types consisting of unspecified bit rate (UBR) service, constant bit rate (CBR) service, and variable bit rate (VBR) service type.

14. The method of claim 1 wherein the first function performs dynamic memory access operations to save information associated with a packet to enable the device control program to transmit the packet.

15. The method of claim 1 wherein the network processor comprises a processing engine subsystem, and the first function instructs the processing engine subsystem to encapsulate buffer data into packets based on a packet encoding type indicated by a parameter in the first parameter list.

16. The method of claim 1 wherein the network processor comprises a processing engine subsystem, and the first function instructs the processing engine subsystem to encapsulate a packet according to a packet encoding type selectable from a group of packet encoding types consisting of local memory-ATM packet type, local memory-ATM-EOP packet type, PCI-ATM packet type, PCI-ATM-EOP packet type, local memory-LANE packet type, local memory-LAN-EOP packet type, PCI-LANE packet type, and PCI-LANE-EOP packet type.

17. The method of claim 1 wherein the network processor comprises a processing engine subsystem, and the first function identifies a type of packet to be added to the processing engine subsystem.

18. The method of claim 1 wherein the network processor comprises a processing engine subsystem, and the first function adds a buffer to the processing engine subsystem based on a packet encoding type selectable from a group of packet encoding types consisting of local memory packet type, local memory-EOP packet type, local memory-UPL-EOP packet type, local memory-drop packet packet type, PCI memory packet type, PCI memory-UPL-EOP packet type, and PCI memory-drop packet packet type.

19. The method of claim 1 wherein the network processor comprises a processing engine subsystem, and the first function provides a buffer encoding type to be used for sending a buffer and returns a type of buffer to be added to the processing engine subsystem.

20. The method of claim 1 wherein the first function performs processing to allow the device control program to pass a received packet to the host application.

21. The method of claim 1 wherein the first function updates a receive and transmit virtual channel pair descriptor in a distribution table to enable loopback of a packet.

22. The method of claim 1 wherein the first function processes a receive report generated in response to a receipt of a packet.

23. The method of claim 1 wherein the first function processes a transmit report generated in response to a transmission of a packet.

24. In a network environment including a host system coupled to a network processor, the host system executing a host application program, a method for allowing the host application program to issue commands to the network processor, the method comprising:

providing a device control program, the device control program providing a plurality of application programming interfaces (APIs);

issuing a command with a first parameter list from the host application program;

communication the command from the host system to the network processor via a communication interface;

translating the command to a first API from the plurality of APIs at the network processor, the first API configured to perform a first function;

performing the first function at the network processor; and communicating a response from performing the first function from the network processor to the host application via the communication interface.

25. The method of claim 24 wherein the communication interface is a PCI bus interface.

26. The method of claim 24 wherein the communication interface is a Gigabit Ethernet interface.

27. In a network environment including a host system and a network processor, the host system executing a host application program, a method for allowing the host application program to issue commands to the network processor, the method comprising:

coupling the host system with the network processor via a PCI bus interface;

providing a device control program executing on the host system, the device control program providing a plurality of application programming interfaces (APIs);

invoking a first API from the plurality of APIs with a first parameter list, the first API configured to perform a first function;

communicating the first API along with the first parameter list to the network processor via the PCI bus interface;

performing the first function at the network processor; and communicating a response from performing the first function from the network processor to the host application via the PCI bus interface.

28. In a network environment including a host system coupled to a network processor, the host system executing a host application program, a computer-readable storage medium storing instructions for allowing the host application program to issue commands to the network processor, the instructions comprising:

instructions for providing a device control program, the device control program providing a plurality of application programming interfaces (APIs);

instructions for initiating invocation of a first API from the plurality of APIs from the host application program, the first API accepting a first parameter list and configured to perform a first function;

instructions for performing the first function at the network processor; and instructions for communicating a response from performing the first function from the network processor to the host application.

29. A network system comprising:

a host system;

a network processor configured to provide a plurality of application programming interfaces (APIs);

a communication interface coupling the host system with the network processor;

the host system configured to initiate invocation of a first API from the plurality of APIs, the first API configured to accept a first parameter list and to perform a first function;

the network processor configured to receive the first API initiated by the host system and to perform the first function;

the network processor further configured to communicate a response from performing the first function to the host system.

30. The network system of claim 29 wherein the communication interface is a PCI bus interface.

31. The network system of claim 29 wherein the communication interface is a Gigabit Ethernet interface.

* * * * *